US011821566B2

United States Patent
Takashima et al.

(10) Patent No.: US 11,821,566 B2
(45) Date of Patent: Nov. 21, 2023

(54) PIPE ROBOT

(71) Applicant: SHONAN GOSEI-JUSHI SEISAKUSHO K.K., Hiratsuka (JP)

(72) Inventors: Michihito Takashima, Funabashi (JP); Takao Kamiyama, Hiratsuka (JP); Kazuaki Ogura, Hiratsuka (JP); Hiroyuki Makuuchi, Hiratsuka (JP)

(73) Assignee: SHONAN GOSEI-JUSHI SEISAKUSHO K.K., Hiratsuka (JP)

( * ) Notice: Subject to any disclaimer, the term of this patent is extended or adjusted under 35 U.S.C. 154(b) by 589 days.

(21) Appl. No.: 17/053,115

(22) PCT Filed: Mar. 20, 2019

(86) PCT No.: PCT/JP2019/011746
§ 371 (c)(1),
(2) Date: Nov. 5, 2020

(87) PCT Pub. No.: WO2019/216033
PCT Pub. Date: Nov. 14, 2019

(65) Prior Publication Data
US 2021/0310597 A1 Oct. 7, 2021

(30) Foreign Application Priority Data

May 7, 2018 (JP) .................. 2018-089132
Jul. 20, 2018 (JP) .................. 2018-136335

(51) Int. Cl.
*F16L 55/26* (2006.01)
*B25J 5/00* (2006.01)
(Continued)

(52) U.S. Cl.
CPC .............. *F16L 55/32* (2013.01); *B25J 5/007* (2013.01); *B25J 9/0009* (2013.01); *B25J 9/126* (2013.01);
(Continued)

(58) Field of Classification Search
CPC ....... F16L 55/32; F16L 55/44; F16L 2101/30; F16L 2101/70; B25J 5/007; B25J 9/0009;
(Continued)

(56) References Cited

U.S. PATENT DOCUMENTS 4,722,001 A * 1/1988 Rohrich ................. F16L 55/28
376/245
5,081,800 A 1/1992 Ruholl
(Continued)

FOREIGN PATENT DOCUMENTS

JP S59109470 A 6/1984
JP H0568917 A 3/1993
(Continued)

OTHER PUBLICATIONS

International Search Report on Application No. PCT/JP2019/011746 dated Jun. 4, 2019.

Primary Examiner — Benjamin F Fiorello
(74) Attorney, Agent, or Firm — MOSER TABOADA

(57) ABSTRACT

An in-pipe robot is provided with a rotary actuator 30 that rotates the drilling blade 21 in the circumferential direction of an existing pipe. A wheel body 50 provided with a traveling wheel 52 on both sides and a wheel body 70 provided with a traveling wheel 72 on both sides are supported between side frames 43 of a chassis via pins 54 and 74. The other ends of both the wheel bodies are rotatably coupled around an axle 63 of an intermediate wheel 65 as a pivot. When both the wheel bodies rotate, the intermediate wheels and the rotary actuator move above a horizontal line passing through the pin center. Each pin is disposed at the midpoint of a line connecting the center of the traveling wheel and the center of the intermediate wheel so that the rotation axis v1 of the rotary actuator coincides with the pipe center axis of the existing pipe.

12 Claims, 22 Drawing Sheets

(51) Int. Cl.
*F16L 55/32* (2006.01)
*B25J 9/00* (2006.01)
*B25J 9/12* (2006.01)
*B25J 9/14* (2006.01)
*B25J 11/00* (2006.01)
*B62D 57/028* (2006.01)
*F16L 55/44* (2006.01)
*F16L 101/30* (2006.01)
*F16L 101/70* (2006.01)

(52) U.S. Cl.
CPC .............. *B25J 9/146* (2013.01); *B25J 11/00* (2013.01); *B62D 57/028* (2013.01); *F16L 55/44* (2013.01); *F16L 2101/30* (2013.01); *F16L 2101/70* (2013.01)

(58) Field of Classification Search
CPC . B25J 9/126; B25J 9/146; B25J 11/00; B62D 57/028
See application file for complete search history.

(56) References Cited

U.S. PATENT DOCUMENTS

| | | | | |
|---|---|---|---|---|
| 5,172,639 A | * | 12/1992 | Wiesman | F16L 55/28 104/138.2 |
| 5,423,230 A | | 6/1995 | Olander et al. | |
| 6,035,786 A | * | 3/2000 | McKay | F16L 55/28 104/138.1 |
| 6,056,017 A | * | 5/2000 | Kamiyama | B29C 63/0086 264/269 |
| 7,073,979 B2 | * | 7/2006 | McGrew | E03F 3/06 73/623 |
| 7,503,349 B2 | * | 3/2009 | Kamiyama | F16L 55/1651 264/269 |
| 10,060,569 B2 | * | 8/2018 | Sivacoe | F16L 55/32 |
| 2013/0328290 A1 | | 12/2013 | Mehrandezh et al. | |
| 2015/0107485 A1 | * | 4/2015 | Hirose | F16L 55/265 105/3 |
| 2016/0123517 A1 | * | 5/2016 | Hirose | F16L 55/32 105/3 |
| 2018/0133918 A1 | | 5/2018 | Itoh et al. | |

FOREIGN PATENT DOCUMENTS

| | | |
|---|---|---|
| JP | H079991 A | 1/1995 |
| JP | 2000097388 A | 4/2000 |
| JP | 2003302219 A | 10/2003 |
| JP | 2005037250 A | 2/2005 |
| JP | 2008142827 A | 6/2008 |
| WO | WO-98/17939 A1 | 4/1998 |
| WO | WO-2015/196297 A1 | 12/2015 |
| WO | WO-2016/163191 A1 | 10/2016 |

* cited by examiner

PIPE ROBOT

TECHNICAL FIELD

The present invention relates to an in-pipe robot that is carried into an existing pipe and travels in the existing pipe for in-pipe work.

BACKGROUND ART

Conventionally, when an existing pipe each as a sewer pipe buried underground has deteriorated, the inner wall surface of the existing pipe is lined for existing pipe rehabilitation with a pipe lining material having a resin absorbent material that is made of a flexible tubular non-woven fabric and impregnated with a setting resin.

Since a lateral pipe communicates with a main pipe such as an above-described sewer pipe, the pipe lining material blocks the lateral pipe opening at the juncture of the lateral pipe when the main pipe is lined with the pipe lining material. Therefore, an in-pipe robot equipped with a drilling blade is transported into the main pipe and operated remotely from aboveground. The drilling blade is rotated to drill from the main pipe side the pipe lining material that blocks the end of the lateral pipe (Patent Document 1 below).

In the drilling work, the cutter of a drilling machine must be positioned respectively in the longitudinal, circumferential and vertical directions of the main pipe prior to drilling. Therefore, the drilling is performed by detecting the center position of the lateral pipe opening and positioning the cutter to the detected position (Patent Document 2 below).

It is necessary to investigate whether the existing pipe should be repaired before rehabilitating the existing pipe. If repairs are carried out after the investigation, it is necessary to verify whether the repairs were carried out as specified. In the investigation conducted before and after such rehabilitation, an in-pipe robot equipped with a camera is transported into the existing pipe to observe and photograph the pipe wall and the like.

For example, Patent Document 3 below describes an inspection device in which a self-propelled vehicle traveling in the sewer is equipped with a camera that swings to change the photographing direction and inspects the internal condition of the lateral pipe branching off from the sewer.

PRIOR ART DOCUMENTS

Patent Documents

Patent Document 1: JP 2000-97388 A
Patent Document 2: JP 2008-142827 A
Patent Document 3: JP 2005-37250 A

SUMMARY OF INVENTION

Problems to be Solved

However, the conventional in-pipe robot is provided with front and rear wheels on both sides and travels on four wheels, so that the traveling in the existing pipe is unstable. The in-pipe robot rotates around the pipe axis of the existing pipe and is likely to roll, causing a problem that the in-pipe work becomes difficult.

For the different pipe diameter of the existing pipe, the rotation axis around which the drilling blade or the camera rotates in the circumferential direction of the existing pipe deviates from the pipe center axis of the existing pipe, so that there was a problem that the drilling blade cuts as unintended part or the camera fails to photograph as intended.

The conventional in-pipe robot is used as a drilling robot for drilling a pipe lining material applied to the inner wall surface of an existing pipe or an inspection robot for observing and photographing the inside of an existing pipe, so that there was a problem that one in-pipe robot could not be used for multi-purposes.

The present invention has been made to solve such problems, and an object thereof is to provided an in-pipe robot capable of stably traveling inside the existing pipe and carrying out various operations performed inside the existing pipe.

Means for Solving the Problems

The present invention related to an in-pipe robot that is carried into an existing pipe and can travel in the existing pipe comprising::

a chassis having on both sides side frames in which a horizontally extending slot is formed;

a first wheel body to which pins slidable in the slot are attached on both sides and which is supported between the side frames via the pins and has traveling wheels attached to one end on both sides;

a second wheel body that is supported between the side frames via pins attached on both sides on the same horizontal plane as the pins of the first wheel body and that has traveling wheels attached to one end on both sides, the other end on both sides being rotatably coupled to the other end of the first wheel body via axles to which intermediate wheels are attached, respectively;

a rotary actuator mounted on the chassis such that the rotation axis thereof is on the same horizontal plane as the pins on both sides of the first and second wheel bodies and is located at the center between the traveling wheels of the first and second wheel bodies; and elevating mans for sliding the pins of the first wheel body in the slots to rotate the first and second wheel bodies around the axles as a pivot and raise and lower the rotary actuator and the intermediate wheels;

wherein the intermediate wheels on both sides and the traveling wheels on both sides of the first and second wheel bodies all have the same shape and the wheel surfaces on each side have the same vertical plane, respectively;

the pin on each side of the first wheel body is attached to the midpoint of a line connecting the traveling wheel center of the first wheel body and the intermediate wheel center on the same side, and the pin on each side of the second wheel body is attached to the midpoint of a line connecting the traveling wheel center of the second wheel body and the intermediate wheel center on the same side; and when the intermediate wheels on both sides are raised until they are brought into contact with the inner wall surface of the existing pipe by the elevating means, the radial distances to the rotation axis of the rotary actuator from points at which the traveling wheels on both sides of the first and second wheel bodies and the intermediate wheels on both sides come into contact with the inner wall surfaces of the existing pipe are respectively equal, and the rotation axis of the rotary actuator coincides with the pipe center axis of the existing pipe.

Effect of the Invention

In the present invention, the intermediate wheels are provided on both sides between the traveling wheels on both sides of each wheel body, so that it is possible to travel stably in the existing pipe by traveling with the wheels brought into contact with the existing pipe. Further, the rotation axis of the rotary actuator can be made coincident with the pipe center axis of the existing pipe, so that a drilling blade for drilling the pipe lining material on the inner wall surface of the existing pipe, a camera for photographing the inner wall surface, or the like can be rotated without any trouble in the circumferential direction of the existing pipe, allowing the in-pipe work to be made efficient. Further, the present invention has an advantage that one robot can be used as a multipurpose robot capable of performing various in-pipe operations.

BRIEF DESCRIPTION OF DRAWINGS

FIG. 12b is an illustrative view showing a state in which the drilling blade is rotated in the circumferential direction of the main pip to drill the pipe lining material from the state shown in FIG. 12a;

MODE OF CARRYING OUT THE INVENTION

The embodiments according to the present invention will now be described with reference to the attached drawings. In the embodiments, an in-pipe robot is described as a drilling robot that drills an opening of an existing pipe closed with a pipe lining material. However, the in-pipe robot of the present invention not only functions as a drilling robot, but also can serve as an inspection robot that observes and photographs the inner wall surface of the existing pipe to inspect the inner wall surface thereof, or serve as a mounting robot that mounts a pipe lining material inserted into a lateral pipe.

Embodiment 1

FIGS. 1 through 14 show an embodiment in which a sever main pipe as an existing pipe is lined with a pipe lining material, and the pipe lining material is then drilled that blocks a lateral pipe opening.

Figure 1:
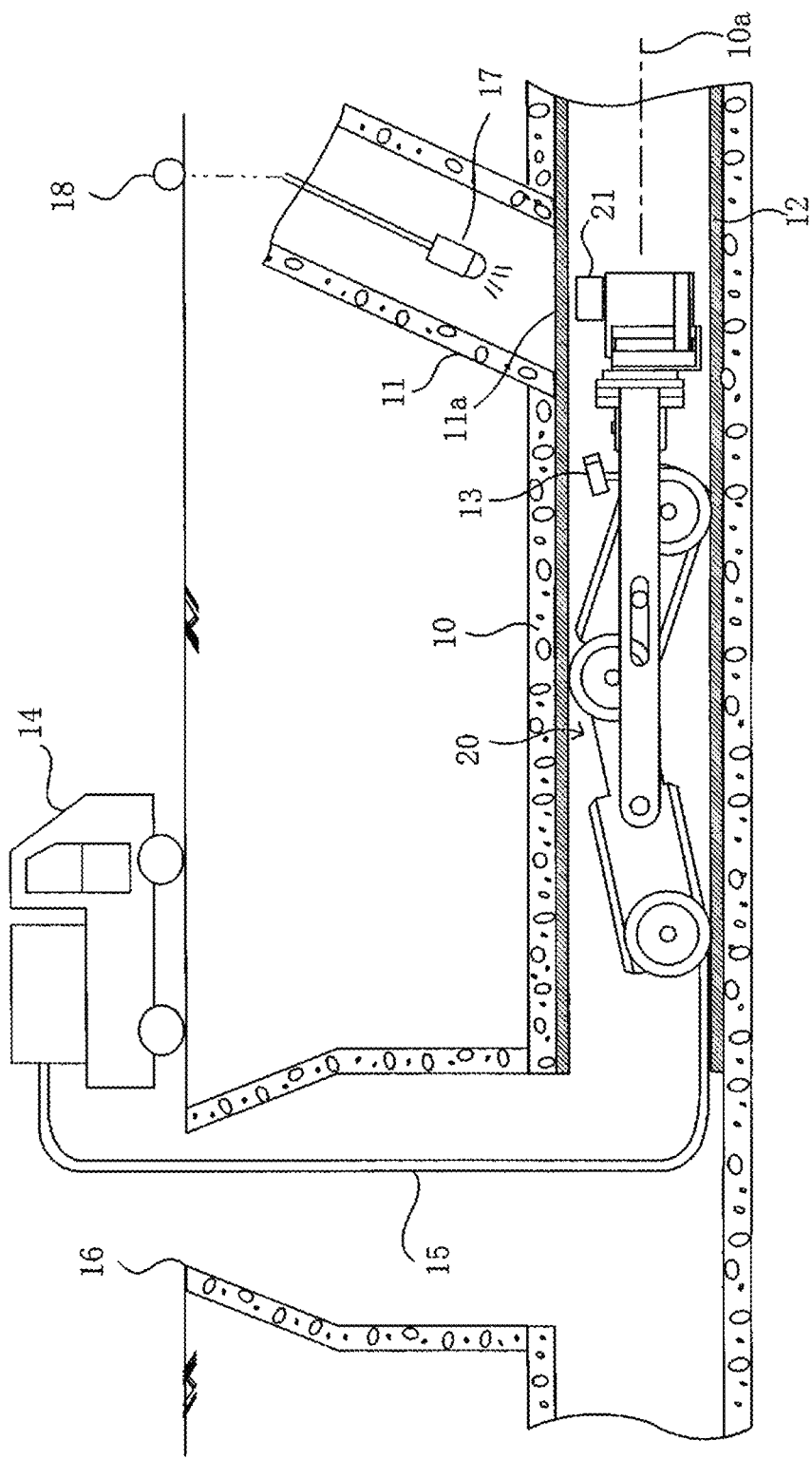
FIG. 1 is an illustrative view schematically showing the structure of an in-pipe robot that travels inside a main pipe lined with a pipe lining material to cut the pipe lining material.

FIG. 1 shows a state in which the inner wall surface of an aged sewer main pipe 10 is lined with a pipe lining material 12 using an eversion or a pull-in method. The pipe lining material 12 includes a resin absorbent material that is made of a flexible tubular non-woven fabric impregnated with an uncured liquid curable resin. For a thermosetting resin, the pipe lining material 12 pressed against the inner surface of the main pipe is heated. For a photocurable resin, the pipe lining material 12 is irradiated with ultraviolet rays and cured to line the inner surface of the main pipe 10. In a case where the pipe lining material is made of hard vinyl chloride, the pipe lining material is drawn into the pipe in a flatly folded state, and the pipe lining material is then heated by steam and restored to a circular shape to line the inner surface of the main pipe 10.

A plurality of lateral pipes 11 branch off from the main pipe 10, and sewage from homes or buildings is discharged into the main pipe 10 through the lateral pipes 11. Once the main pipe 10 is, as shown in FIG. 1, lined with the pipe lining material 12, the lateral pipe 11 which remained open at an opening 11a thereof is blocked by the pipe lining material 12. An in-pipe robot 20 equipped with a drilling blade 21 is carried into the main pipe 10 from a manhole 16 and the drilling blade 21 is raised and rotated to cut and drill the pipe lining material 12 that blocks the lateral pipe opening 11a.

A work truck 14 is provided with a power supply, a hydraulic unit, a controller, a console, and the like for driving and controlling the in-pipe robot 20. Voltage and pressured oil are supplied to various operating devices in the in-pipe robot 20 via a power supply line, a control line and a hydraulic pipe housed in a pipe 15, and control signals are also transmitted thereto. A camera 13 is mounted on the in-pipe robot 20 to photograph a region near the lateral pipe opening 11a from the main pipe side. The lateral pipe opening 11a is illuminated by an illumination lamp 17 lit by a power source 18, and the camera 13 can also capture a bright part image due to illumination light transmitted through the pipe lining material 12. The image taken by the camera 13 is transmitted to the work truck 14 via the signal line in the pipe 15 and displayed on the display so that the operator can observe the drilling.

Figure 2:
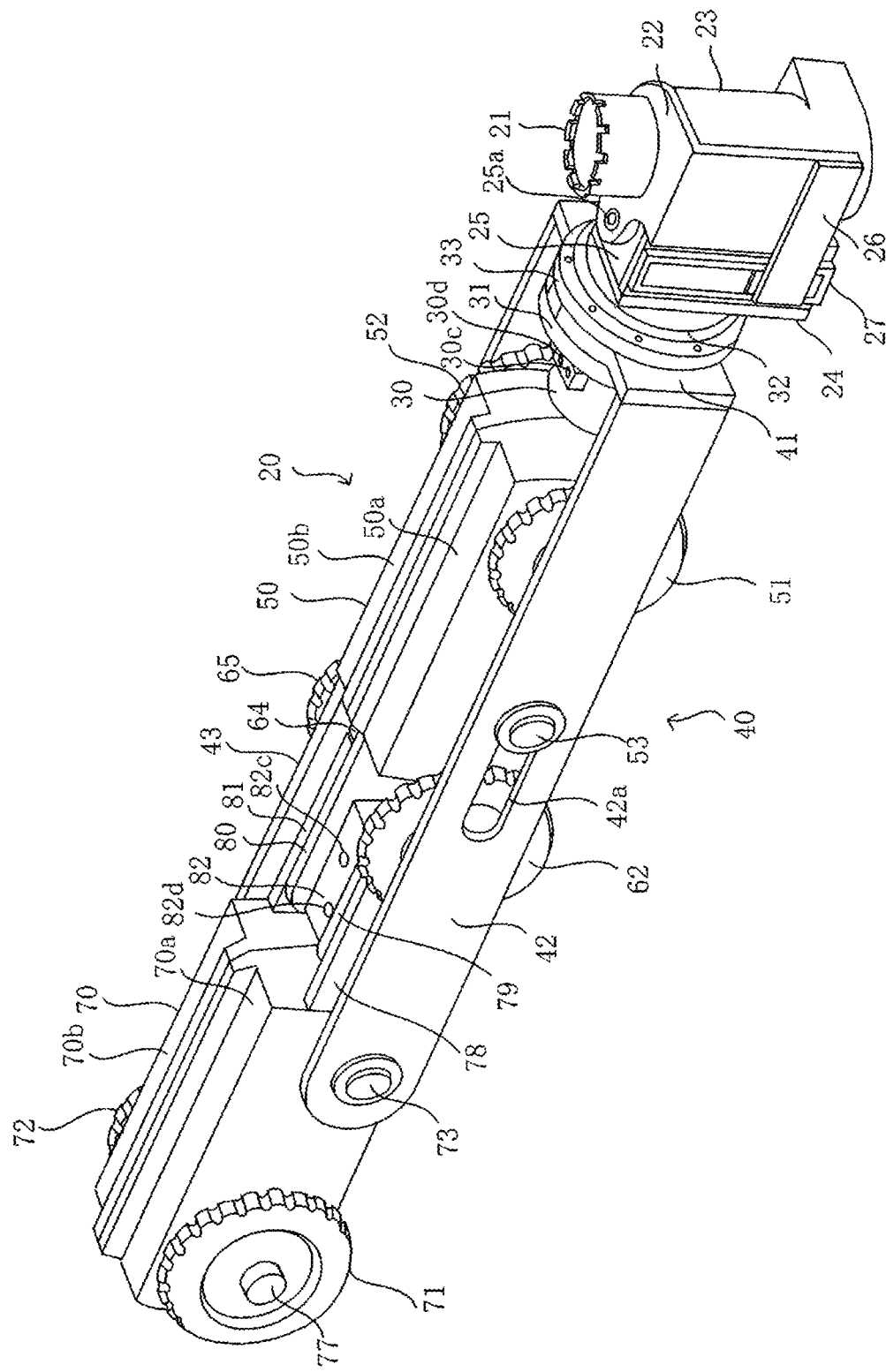
FIG. 2 is a perspective view of the in-pipe robot as viewed from one side.
Figure 3:
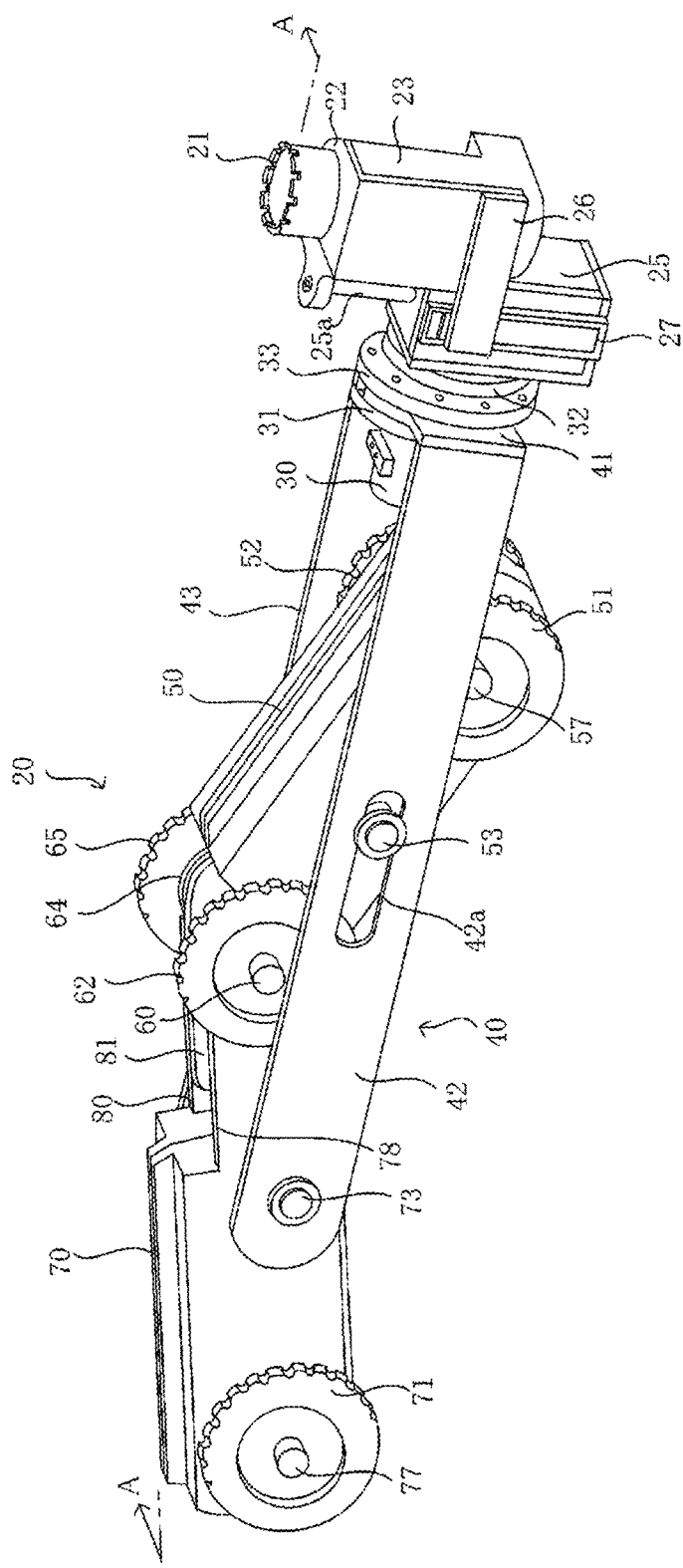
FIG. 3 is a perspective view showing the in-pipe robot as viewed when wheel bodies are rotated to raise a drilling blade.
Figure 4:
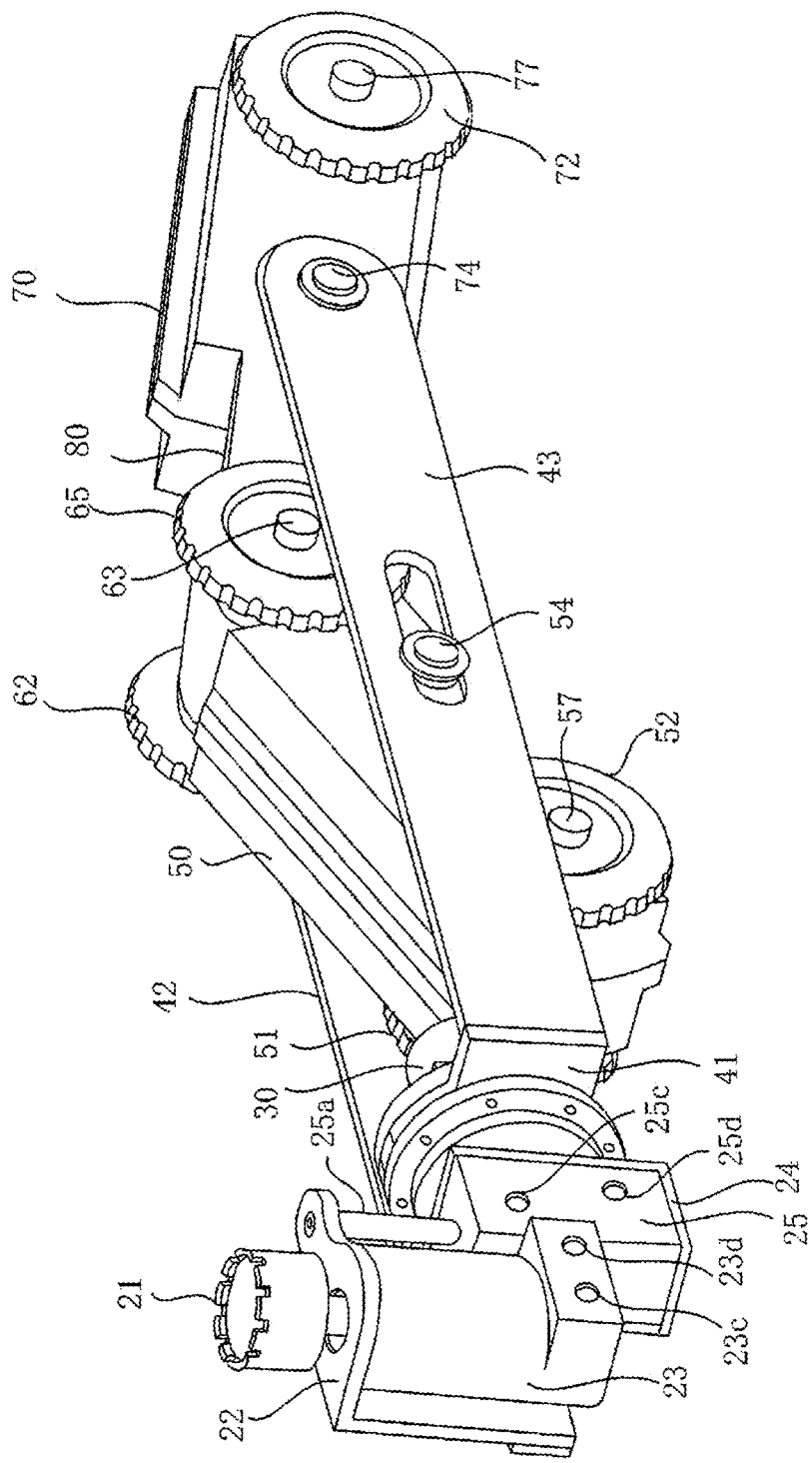
FIG. 4 is a perspective view of the in-pipe robot as viewed from the other side.

FIG. 2 through 4 show the in-pipe robot 20 as a perspective view. The in-pipe robot 20 has a chassis 40, which includes a front frame 41 and on both sides plate-shaped side frames 42, 43 having the same shape and having one end fixed to the front frame 41 and extending in the horizontal direction in parallel with each other. The side frames 42 and 43 are provided with slots 42a and 43a which extend in the horizontal direction and whose width (vertical) centers coincide with those of the side frames 42 and 43.

Figure 5:
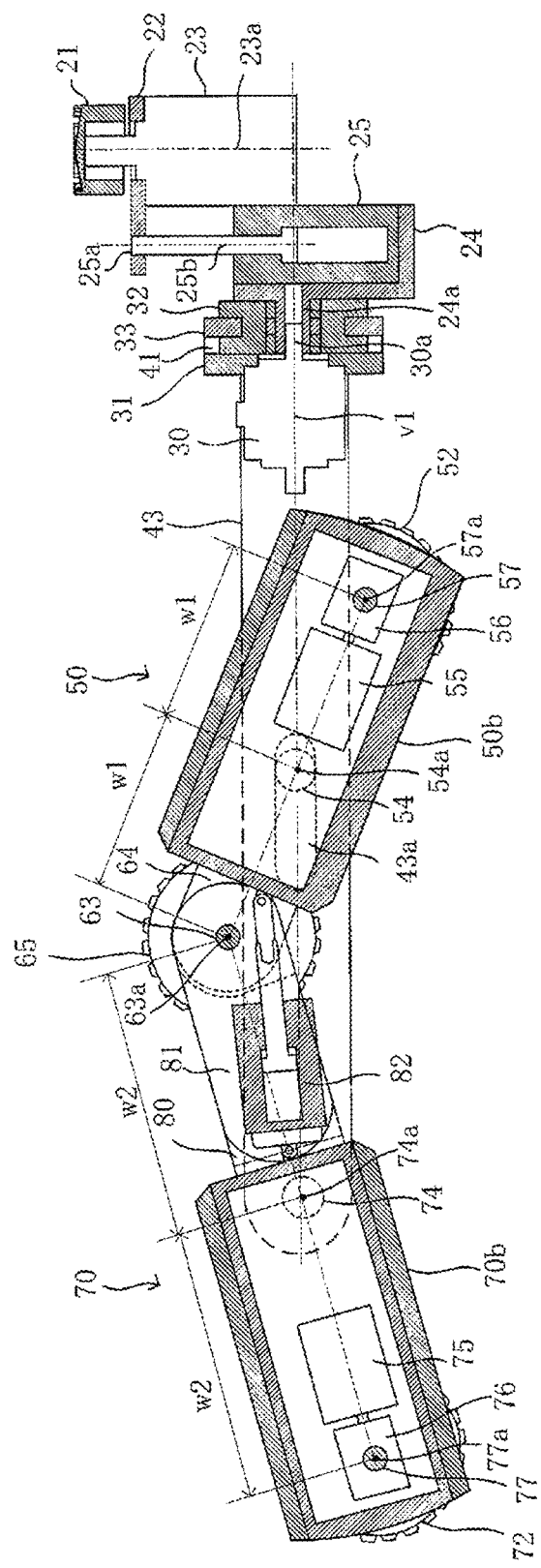
FIG. 5 is a vertical cross-sectional view of the in-pipe robot along the line A-A of FIG. 3.

The in-pipe robot 20 has a drilling motor 23 that is supported by a holder 22 to rotate the drilling blade 21, and an elevating cylinder 25 that is supported by a holder 24 to raise and lower the drilling blade 21 in the vertical direction. The drilling motor 23 is configured as a hydraulic motor including hydraulic ports 23c and 23d, and the elevating cylinder 25 is configured as a hydraulic cylinder including hydraulic ports 25c and 25d. As shown in FIG. 5, the upper portion of the holder 22 is coupled to the distal end of the piston 25a of the elevating cylinder 25. Attached to the lower portion of the holder 22 is a lateral plate 26 that moves along a guide 27 fixed to the holder 24. When the elevating cylinder 25 is driven to move the piston 25a upwards and downwards, the holder 22 coupled to the piston 25a moves upwards and downwards along the guide 27 to raise and lower the drilling blade 21.

The holder 24 has on the side opposite to the drilling blade 21 a hollow cylindrical portion 24a into which a rotary shaft 30a of a rotary actuator 30 configured as a hydraulic motor having hydraulic ports 30c and 30d is press-fitted, as shown in FIG. 5. The cylindrical portion 24a of the holder 24 is detachably supported by a sliding bearing 32 provided with a flange 33. When the rotary actuator 30 is driven, the elevating cylinder 25 and the drilling motor 23 rotate around the rotation axis v1 of the rotary actuator 30, and the rotation axis of the drilling blade 21 (rotation axis 23a of the drilling motor 23) rotates (swings) in the circumferential direction of the main pipe around the rotation axis v1 of the rotary actuator 30.

A flange 31 is attached to the rotary actuator 30, and the front frame 41 of the chassis 40 is sandwiched between the flange 31 and the flange 33 of the sliding bearing 32. The flanges 31 and 33 are bolted at multiple points to mount the rotary actuator 30, the elevating cylinder 25 and the drilling motor 23 on the chassis 40. It is to be noted that the drilling blade 21, the drilling motor 23, the elevating cylinder 25, the holders 22, 24, and the like can be integrated and mounted to the chassis 40 as a drilling unit. In this case, the drilling unit can be removed from the chassis 40 by releasing the press-fitting of the rotary shaft 30a of the rotary actuator 30 into the holder 24 and removing the holder 24 from the sliding bearing 32, so that, instead thereof, an inspection unit can be mounted to the chassis, as described later.

Figure 6:
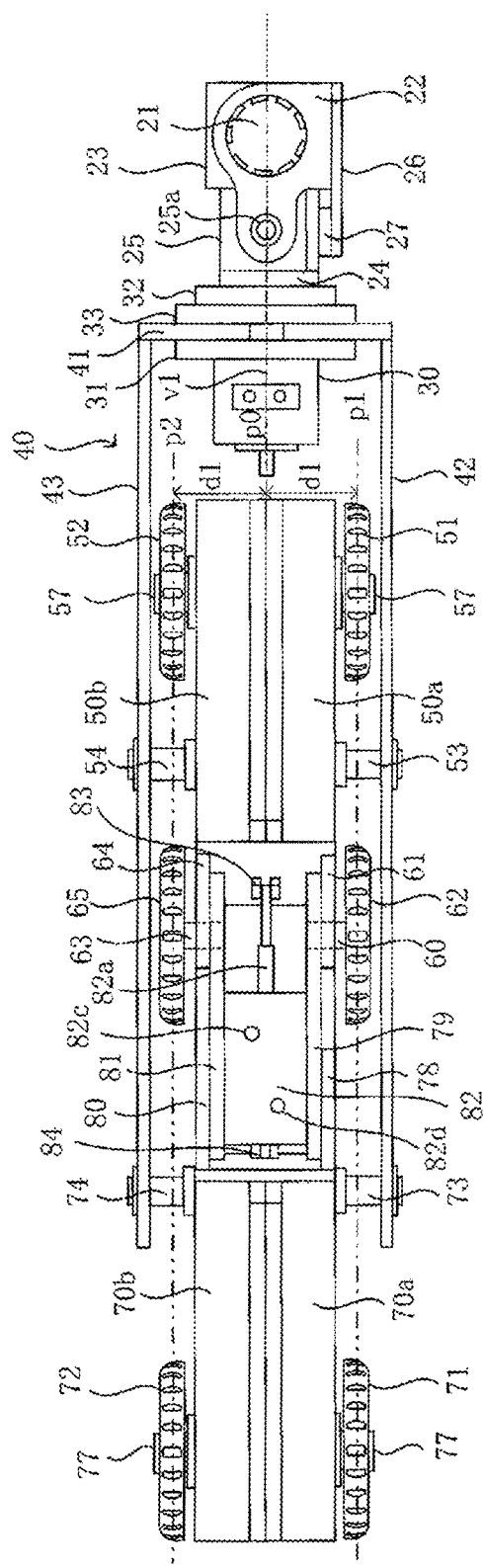
FIG. 6 is a top view of the in-pipe robot.

As shown in FIGS. 5 and 6, the rotary actuator 30 is mounted to the chassis 40 such that the horizontally extending rotation axis v1 thereof is orthogonal to the rotation axis 23a of the drilling motor 23 and the central axis 25b of the piston 25a of the elevating cylinder 25, and it passes through the vertical width center of the slots 42a and 43a of the side frames 42 and 43 and the width center between the side frames 42 and 43.

A wheel body (first wheel body) 50 disposed in front of the chassis 40 and a wheel body (second wheel body) 70 disposed in the rear are supported between the side frames 42 and 43 of the chassis 40. The wheel body 50 has at one end on both sides traveling wheels 51 and 52 as front wheels attached, and at central portion on both sides pins 53 and 54 fixed respectively that are fitted into slots 42a and 43a formed in the side frames 42 and 43. The wheel body 50 is supported between both the side frames 42 and 43 by the pins 53 and 54. Each of the pins 53 and 54 has a circular cross section, and the diameter thereof is slightly smaller than the vertical width of the slots 42a and 43a so that the pins 53 and 54 can slide in the slots 42a and 43a.

The wheel body 50 comprises two halves 50a and 50b having the same shape that can be bolted and connected, and the inside thereof is hollow where a traveling motor 55 composed of an electric motor (DC motor) is attached. The traveling motor 55 uses a gearbox 56 to rotate an axle 57 having a circular cross section to which the traveling wheels 51 and 52 are attached, thus rotating the traveling wheels 51 and 52.

The wheel body 70 has the same configuration as the wheel body 50. Traveling wheels 71 and 72 serving as rear wheels are attached to one end on both sides of the wheel body 70, and pins 73, 74 having a circular cross section are fixed to the central portion on both sides thereof. The pines 73 and 74 enter holes formed in the side frames 42 and 43, and the wheel body 70 is supported by the pins 73 and 74 between both the side frames 42 and 43.

The pins 53, 54, 73, and 74 of the wheel bodies 50 and 70 are attached to thereto such that their pin centers are at the same height as the rotation axis v1 of the rotary actuator 30 and are on the horizontal plane h1 (FIGS. 8 and 9) passing through the rotation axis v1.

The wheel body 70 comprises tow halves 70a and 70b having the same shape that can be bolted and connected, and the inside thereof is hollow where a traveling motor 75 composed of an electric motor (DC motor) is attached. The traveling motor 75 uses a gearbox 76 to rotate an axle 77 having a circular cross section on which the traveling wheels 71 and 72 are attached, thus rotating the traveling wheels 71 and 72.

As shown in FIG. 6, and arm 61 to which an axle 60 having a circular cross section is fixed is integrally attached to the other end of the wheel body 50 on the side of the side frame 42. An intermediate wheel 62 is rotatably attached to the end of the axle 60 toward the side frame 42. An arm 79 integrally coupled to an arm 78 fixed to the wheel body 70 is rotatably attached to the other end of the axle 60. Thus, the wheel bodies 50 and 70 are rotatably coupled at the other end on one side via the axle 60.

Similarly, an arm 64 to which an axle 63 concentric with the axle 60 and having the same diameter and a circular cross section is fixed is integrally attached to the other end of the wheel body 50 on he side of the side frame 43. An intermediate wheel 65 is rotatably attached to the end of the axle 63 toward the side frame 43. An arm 81 integrally coupled to an arm 80 fixed to the wheel body 70 is rotatably attached to the other end of the axle 63. Thus, the wheel bodies 50 and 70 are rotatably coupled at the other end on the other side via the axle 63.

The axles 60 and 63 are not fixed to the arms 61 and 64 on the other side of the wheel body 50, but may be fixed to the arms 79 and 81 on the other side of the wheel body 70 to rotatably couple the other ends of the wheel bodies 50 and 70. Further, it is also possible to attach the intermediate wheels 62 and 65 to the axles 60 and 63 so as not to be rotatable and to rotatably support the axle 60 by the arm 61 of the wheel body 50 and the arm 79 of the wheel body 70 and rotatably support the axle 63 by the arm 64 of the wheel body 50 and the arm 81 of the wheel body 70. In either configuration, the wheel bodies 50, 70 are rotatably coupled via the axles 60, 63.

As shown in FIG. 5, the pin 54 on the side of the side frame 43 is attached to the wheel body 50 such that its center 54a is located at the midpoint of a line connecting the center of the traveling wheel 52 (the center 57a of the axle 57) and the center of the intermediate wheel 65 (the center 63a of the axle 63). Therefore, the distances from the pin center 54a to the axle center 63a and the axle center 57a are equal to w1. Further, the pin 74 on the side of the side frame 43 is attached to the wheel body 70 such that its center 74a is located at the midpoint of a line connecting the center of the traveling wheel 72 (the center 77a of the axle 77) and the center of the intermediate wheel 65 (the center 63a of the axle 63). Therefore, the distances from the pin center 74a to the axle center 63a and the axle center 77a are equal to w2.

The position of the pin 53 on the side of the side frame 42 is the same as that of the pin 54. The pin 53 is attached to the wheel body 50 such that its center is located at the midpoint of a line connecting the center of the traveling wheel 51 (the center of the axle 57) and the center of the intermediate wheel 62 (the center of the axle 60). Therefore, the distances from the center of the pin 53 to the center of the axle 60 and the center of the axle 57 are equal to w1. Further, the pin 73 on the side of the side frame 42 is attached to the wheel body 70 such that its center is located at the midpoint of a line connecting the center of the traveling wheel 71 (the center of the axle 77) and the center of the intermediate wheel 62 (the center of the axle 60). Therefore, the distances from the center of the pin 73 to the center of the axle 60 and the center of the axle 77 are equal to w2. Note that w1 and w2 can be set to the same or different values.

As shown in FIG. 6, the intermediate wheels 62, 65 on both sides and the traveling wheels 51, 52, 71, 72 of the first and second wheel bodies 50, 70 all have the same diameter and shape, and are attached so that the wheel surfaces (central wheel surfaces) of the intermediate wheels 62 and the traveling wheels 51 and 71 on the side of the side frame 42 are respectively on the same vertical plane p1 and the wheel surfaces (central wheel surface) of the intermediate wheels 65 and the traveling wheels 52 and 72 on the side of the side frame 43 are respectively on the same vertical plane p2. Further, the rotary actuator 30 is attached so that its rotation axis v1 is on the vertical plane p0 that passes through the center between the vertical planes p1 and p2. Here, the wheel surface is defined, as shown in FIG. 6, as the central wheel surface at the center of the wheel width as viewed in the extending direction of the axle, but can also be defined as the outer surface of the wheel (the surface facing the side frame) or the inner surface of the wheel (the surface opposite to the side frame).

As shown in FIG. 6, a clamp cylinder 82 as means for raising and lowering the rotary actuator 30 and the intermediate wheels 62 and 65 are disposed between the wheel bodies 50 and 70. The clamp cylinder 82 has a piston 82a coupled to the wheel body 50 via a clevis joint 83 and a cylinder section coupled to the wheel body 70 via a clevis joint 84. The clamp cylinder 82 is configured as a hydraulic cylinder provided with hydraulic ports 82c and 82d. The piston 82a of the clamp cylinder 82 may be coupled to the wheel body 70, and the cylinder section may be coupled to the wheel body 54.

Figure 7:
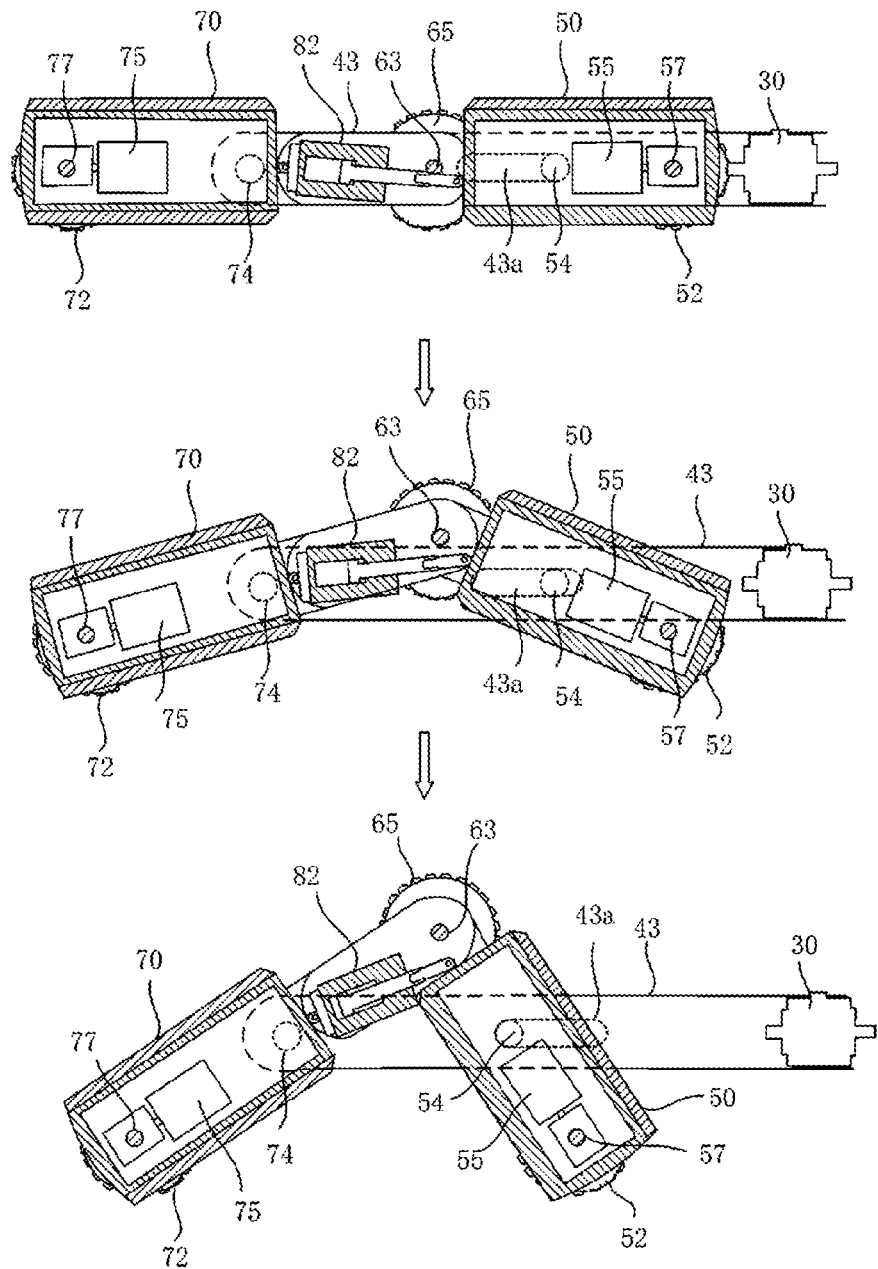
FIG. 7 is a cross-sectional view of the wheel bodies showing a process in which they rotate to raise an intermediate wheel.
Figure 8:
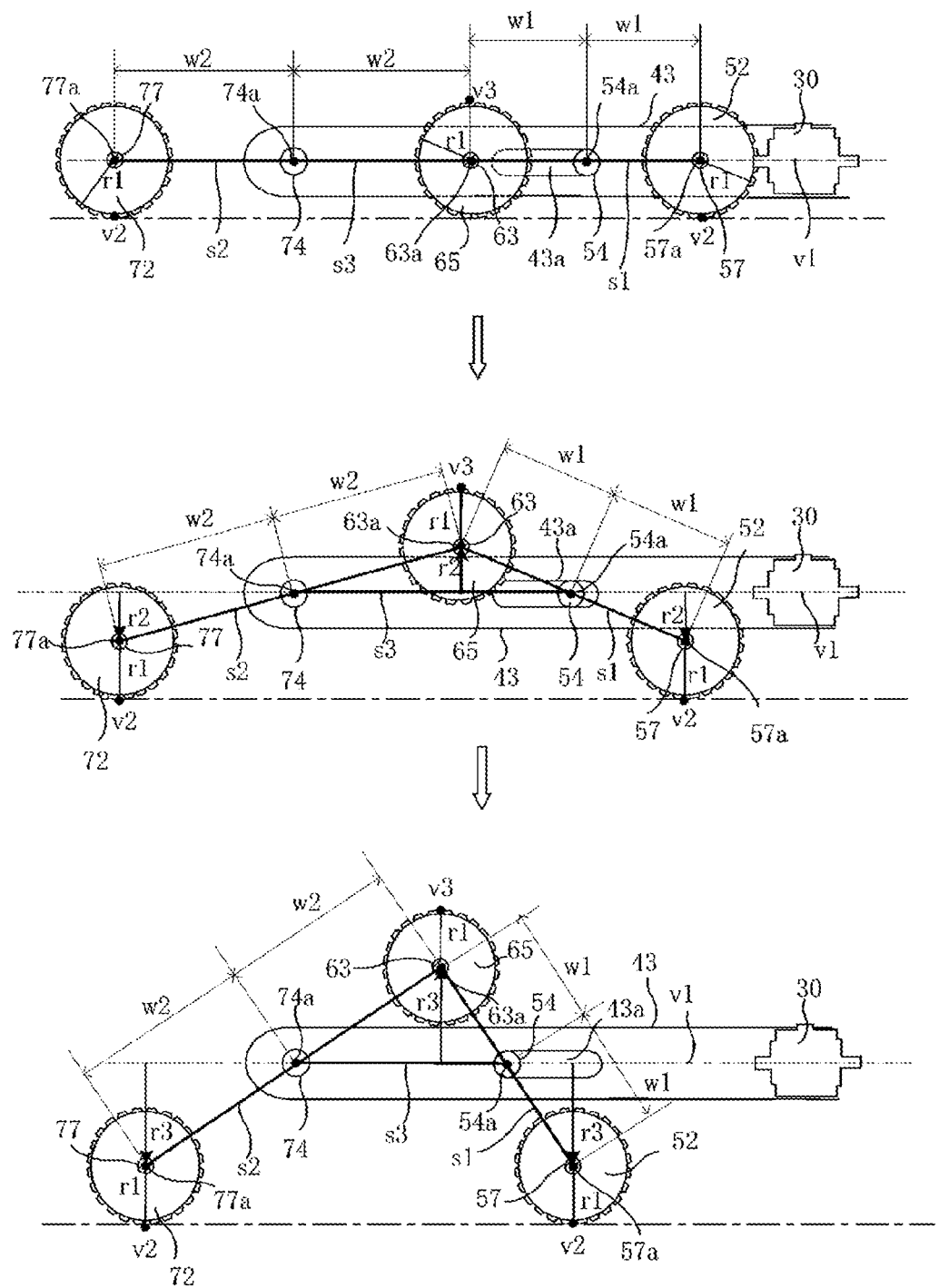
FIG. 8 is an illustrative view showing a process as viewed from one side in which the wheel bodies rotate to raise the intermediate wheel.

When the clamp cylinder 82 is driven to raise or lower the piston 82a, an attractive or repulsive force is generated between the first and second wheel bodies 50 and 70. With this force, the pins 53 and 54 slide in the slots 42a and 43a of the side frames 42 and 43, so that the distance from the pins 73 and 74 enlarges or shortens, causing the wheel bodies 50 and 70 to rotate around the axles 60 and 63 as a pivot and vary the inclination angle of the wheel bodies 50 and 70 relative to the rotation axis v1 of the rotary actuators 30. FIG. 7 shows the movement of primary members when an attractive force acts between the wheel bodies 50 and 70, and FIG. 8 shows its schematical illustration. The movement of the traveling wheels 52, 72 and the intermediate wheels 65 on the side of the side frame 43 will be described below with reference to FIGS. 7 and 8, but the same applies to that of the raveling wheels 51, 71 and the intermediate wheels 62 on the side of the side frame 42.

The horizontal width of the slot 43a formed in the side frame 43 is set so that the wheel bodies 50 and 70 are not inclined relative to the rotation axis v1 of the rotary actuator 30 when the pin 54 is at the rightmost end, as shown in the upper part of FIGS. 7 and 8, and are inclined about 45 degrees when the pin 54 is a the leftmost end, as shown in the lower part thereof.

Figure 9:
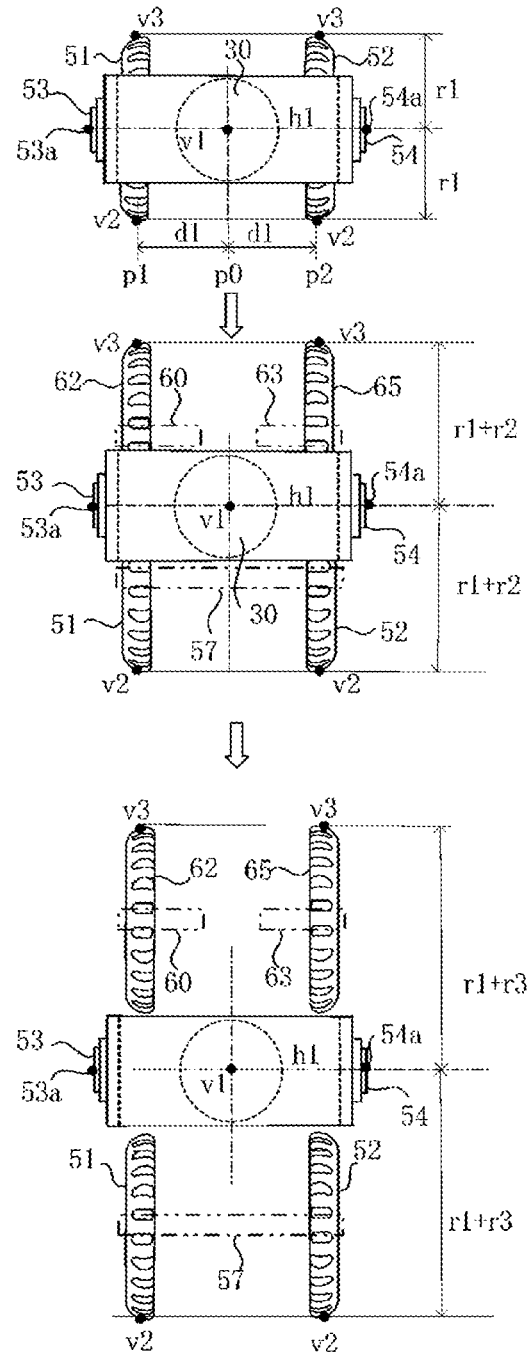
FIG. 9 is an illustrative view showing a process as viewed from the front in which the wheel bodies rotate to raise the intermediate wheels.

Initially, the clamp cylinder 82 is not driven and the pin 54 is at the rightmost position of the slot 43a, as shown in the upper part of FIGS. 7, 8 and 9. The rotation axis v1 of the rotary actuator 30 and the pin centers 54a and 74a of the pins 54 and 74 are at the same height on the same horizontal plane h1, and are at the same vertical distance from a reference line, for example, a tangent extending in the horizontal direction at the lowest point v2 of the traveling wheels 52 and 72. The rotation axis v1 of the rotary actuator 30 is on the central vertical plane p0 of the wheels 51, 52, 71, 72, 62, 65. The vertical distance from the uppermost point v3 of the intermediate wheel 65 to the horizontal plane h1 and the vertical distance from the lowest point v2 of the traveling wheels 52 and 72 to the horizontal plane h1 have the same value r1 corresponding to the radius r1 of each wheel, as shown in the upper part of FIGS. 8 and 9. A line s1 connecting the center of the traveling wheel 52 (center 57a of the axle 57) and the center of the intermediate wheel 65 (center 63a of the axle 63), a line s2 connecting the center of the traveling wheel 72 (center 77a of the axle 77) and the center of the intermediate wheel 65 (the center 63a of the axle 63), and a line s3 connecting the centers 54a and 74a of the pins 54 and 74 are all on the horizontal plane h1.

When the clamp cylinder 82 is driven to generate an attractive force between the wheel bodies 50 and 70, the pin 54 slides to the left in the slot 43a as shown in the middle of FIGS. 7 and 8, so that the distance between the pins 54 and 74 shortens and the wheel bodies 50 and 70 rotate around the axle 63 as a pivot. The inclination angle of the lines s1 and s2 relative to the line s3 enlarges and the intermediate wheel 65 and the side frame 43 rise. Since the center 54a of the pin 54 is at the midpoint of the line s1 and the center 74a of the pin 74 is at the midpoint of the line s2, the amount of vertical downward movement of the traveling wheels 52 and 72 from the line s3 has the same value r2 as the amount of vertical upward movement of the intermediate wheel 65 from the line s3. The vertical distance from the highest point v3 of the intermediate wheel 65 to the horizontal plane h1 and the vertical distance from the lowest point v2 of the traveling wheels 52 and 72 to the horizontal plane h1 become r1+r2, as shown in the middle of FIGS. 8 and 9.

When an attractive force is further generated between the wheel bodies 50 and 70, the pin 54 slides to the leftmost end of the slot 43a and the inclination angle of the lines s1 and s2 relative to the line s3 further enlarges as shown in the lower part of FIGS. 7 and 8. Since, also in this case, the center 54a of the pin 54 is at the midpoint of the line s1 and the center 74a of the pin 74 is at the midpoint of the line s2, the amount of vertical downward movement of the traveling wheels 52 and 72 from the line s3 has the same value r3 as the amount of vertical upward movement of the intermediate wheel 65 from the line s3. The vertical distance from the highest point v3 of the intermediate wheel 65 to the horizontal plane h1 and the vertical distance from the lowest point v2 of the traveling wheels 52 and 72 to the horizontal plane h1 become r1+r3, as shown in the lower part of FIGS. 8 and 9.

The above-mentioned relationship is the same even if a repulsive force acts between the wheel bodies 50 and 70 to rotate the wheel bodies 50 and 70 in the opposite directions. Regardless of the position of the pin 54 in the slot 43a, the intermediate wheels 62, 65 and the traveling wheels 51, 52, 71, 72 are separated the same distance in the vertical direction from the horizontal plane h1.

Figure 14:
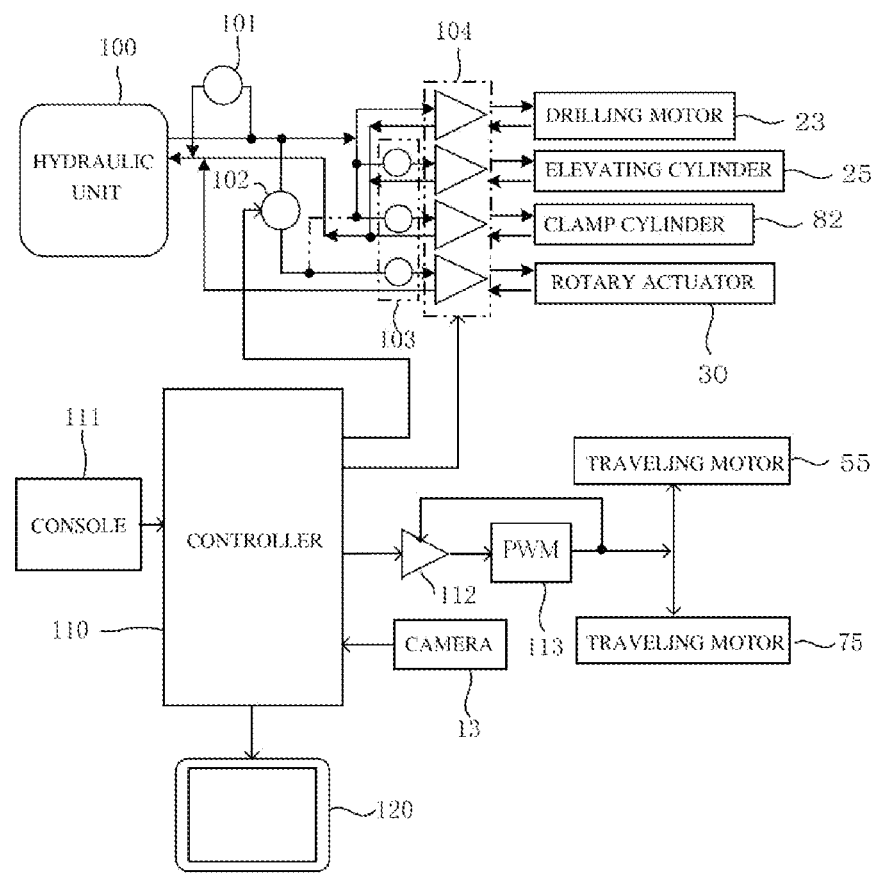
FIG. 14 is a block diagram showing a configuration for driving various devices of the in-pipe robot.

FIG. 14 shows hydraulic devices of the drilling motor 23, the elevating cylinder 25, the clamp cylinder 82 and the rotary actuator 30 that are mounted on the in-pipe robot 20, the circuits for driving and controlling the traveling motors 55 and 75.

A hydraulic circuit is shown in the upper part of FIG. 14. Compressed oil flowing from a hydraulic unit 100 via a relief valve 101 is supplied to the drilling motor 23 via a direction switching valve 104 to rotate the drilling blade 21 in both directions. The compressed oil is adjusted by a throttle valve 103 in terms of the flow rate and supplied to the elevating cylinder 25, the clamp cylinder 82, and the rotary actuator 30 via the direction switching valve 104 to raise or lower the drilling blade 21, to rotate the wheel bodies 50 and 70, and to rotate the drilling blade 21, respectively. The rotary actuator 30 is supplied with oil decompressed by a regulator 102 in response to a signal from a controller 110. The direction switching valves 104 are individually controlled by the controller 110, but in FIG. 14, they are shown as being controlled simply by one control line.

The traveling motors 55 and 75 housed in the wheel bodies 50 and 70 are driven by a speed command from the controller 110 to synchronously rotate the traveling wheels 51, 52, 71 and 72 in the forward or reverse direction, respectively. The speed command is amplified by an amplifier 112 and input to a pulse width modulator (PWM) 113 to modulate the pulse width, so that the traveling wheels 51, 52, 71, 72 are rotated at a speed corresponding to the pulse width.

The image taken by the camera 13 mounted on the in-pipe robot 20 is input to the controller 110, image-processed and displayed on a display 120. A console 111 is connected to the controller 110 to input thereto signals for driving and controlling the in-pipe robot 20 such as hydraulic pressure adjustment, switching of the direction switching valve, speed command and the like.

In the drawings, hydraulic hoses connected to the drilling motor 23, the elevating cylinder 25, the clamp cylinder 82 and the rotary actuator 30, and a power cable for driving the traveling motors 55 and 75, etc. are not shown because the illustration becomes complicated.

Next, an operation will be described in which the in-pipe robot thus configured is transported into the main pipe to drill the pipe lining material.

Figure 10A:
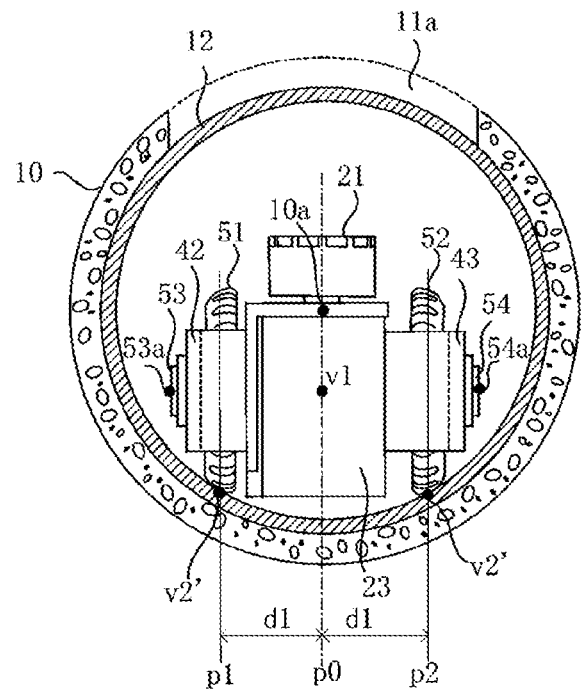
FIG. 10a is an illustrative view showing an initial state of the in-pipe robot carried into the main pipe.

As shown in the upper part of FIGS. 7 to 9, the in-pipe robot 20 is carried into the main pipe 10 with the wheel bodies 50 and 70 made horizontal. As illustrated in FIG. 10a, the rotation axis v1 of the rotary actuator 30 is on the vertical plane p0 passing through the center between the vertical planes p1 and p2, and the horizontal distances to the vertical plane p0 from points v2' at which the traveling wheels 51 and 52 on both sides come into contact with the pipe lining material 12 each have an equal value d1.

Figure 10B:
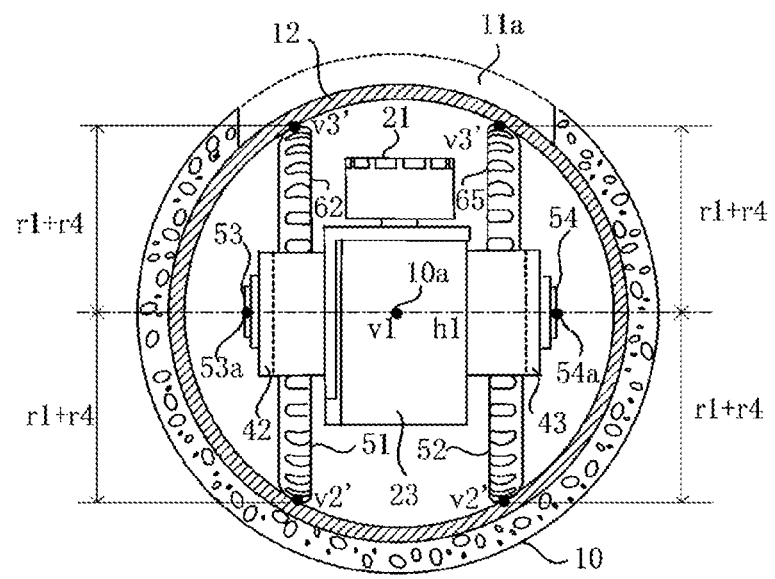
FIG. 10b is an illustrative view showing a state in which the wheel body rotation in the main pipe and the intermediate wheels come into contact with the upper part of the pipe lining material of the main pipe.

Subsequently, the clamp cylinder 82 is driven to generate an attractive force between the wheel bodies 50 and 70 and rotates the wheel bodies 50 and 70. The intermediate wheels 62 and 65 and the rotary actuator 30 are then raised according to the rotational angle. As shown in FIG. 10b, when the intermediate wheels 62 and 65 come into contact with the upper portion of the pipe lining material 12, the hydraulic pressure of the clamp cylinder 82 is maintained to hold this state.

In this state, assuming that the amount of vertical upward movement of the intermediate wheels 62 and 65 from the line s3 is r4, the vertical distance to the horizontal plane h1 from the points v2' at which the traveling wheels 51 and 52 (although invisible in FIG. 10b, also the traveling wheels 71 and 72) come into contact with the pipe lining material is r1+r4, as shown in FIG. 10b, and the vertical distances to the horizontal plane h1 from points v3' at which the intermediate wheels 62 and 65 come into contact with the pipe lining material is also the same r1+r4. In the state shown in FIG. 10b, the radial distances to the rotation axis v1 of the rotary actuator 30 from the points v2' and v3' at which the wheels come into contact with the pipe lining material are all equal, so that the rotation axis v1 of the rotary actuator 30 coincides with the pipe central axis 10a of the main pipe 10.

In a state in which the intermediate wheels 62 and 65 are thus in contact with the upper portion of the pipe lining material, the traveling motors 55 and 75 are driven to advance the in-pipe robot 20. At this time, the hydraulic pressure of the clamp cylinder 82 is adjusted by the regulator 102 in FIG. 14 so that the intermediate wheels 62 and 65 rotate freely according to the forward movement due to the frictional resistance between the intermediate wheels 62 and 65 and the pipe lining material 12.

Figure 11A:
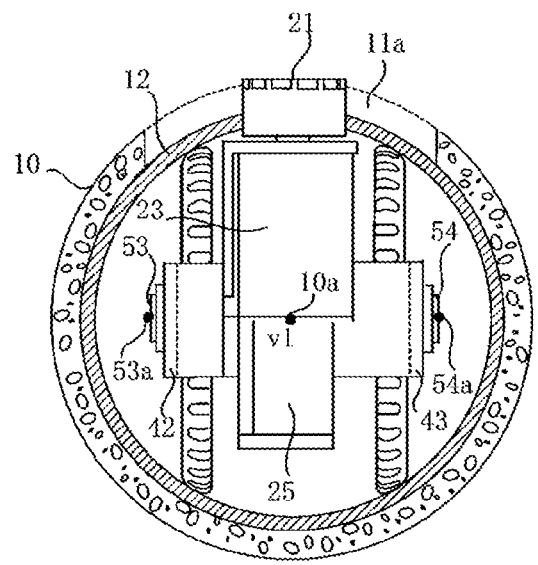
FIG. 11a is an illustrative view showing a state in which a drilling blade is raised to drill the pipe lining material in the state shown in FIG. 10b.

When the drilling blade 21 advances to the vicinity of the center of the lateral pipe opening 11a, the traveling motors 55 and 75 are stopped, and the hydraulic pressure of the clamp cylinder 82 is adjusted to a high pressure by the regulator 102 in order to drive the clamp cylinder 82 with the high pressure, as shown by the dotted line. As a result, the intermediate wheels 62 and 65 strongly press against the upper part of the pipe lining material 12 in an attempt to further rise, and the traveling wheels 51, 52, 71 and 72 strongly press against the lower part of the pipe lining material 12 by a reaction force, so that the in-pipe robot 20 can be stabilized. In this state, as shown in FIG. 11a, the drilling blade 21 is rotated by the drilling motor 23 and the elevating cylinder 25 is driven to raise the drilling blade 21 to cut the lining material 12 in the main pipe 10 that blocks the lateral pipe opening 11a.

Figure 11B:
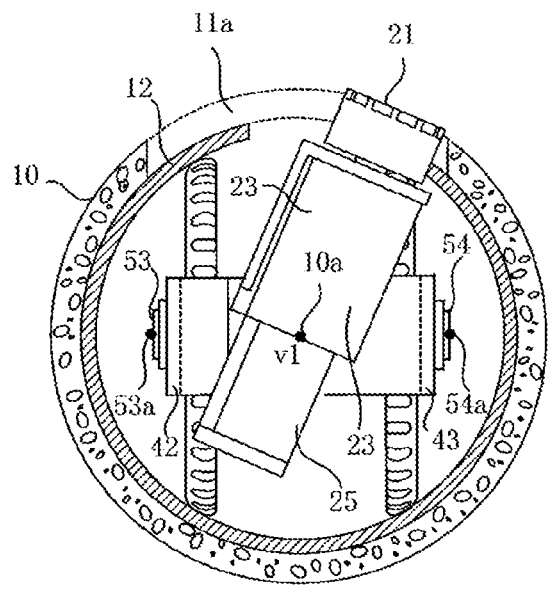
FIG. 11b is an illustrative view showing a state in which the drilling blade is rotated in the circumferential direction of the main pipe to drill the pipe lining material from the state shown in FIG. 10b.

The diameter of the drilling blade 21 is smaller than that of the lateral pipe opening 11a, and if the pipe lining material cannot be completely cut by this one operation, the drilling blade 21 is lowered once and the drilling blade 21 is, as shown in FIG. 11b, rotated around the rotation axis v1 of the rotary actuator 30 to cut the pipe lining material 12. Since the rotation axis v1 of the rotary actuator 30 coincides with the pipe center axis 10a of the main pipe 10, there is no eccentricity in the rotation of the drilling blade 21 in the circumferential direction of the main pipe, ensuring that the cutting in the circumferential direction of the main pipe can be performed smoothly.

When the pipe lining material to be cut remains, the in-pipe robot 20 is moved forward or backward, and the remaining pipe lining material 12 that blocks the lateral pipe 11 is cut in the same operation. When moving the in-pipe robot 20 back and forth, the hydraulic pressure supplied to the clamp cylinder 82 is reduced to facilitate the back-and-forth movement. At the time of drilling, the pressure is increased to stabilize the in-pipe robot 20.

Figure 12A:
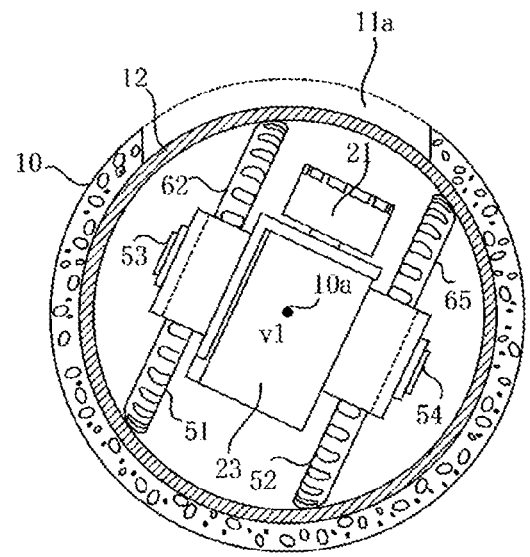
FIG. 12a is an illustrative view showing a state in which the in-pipe robot rolls and advances.
Figure 12B:
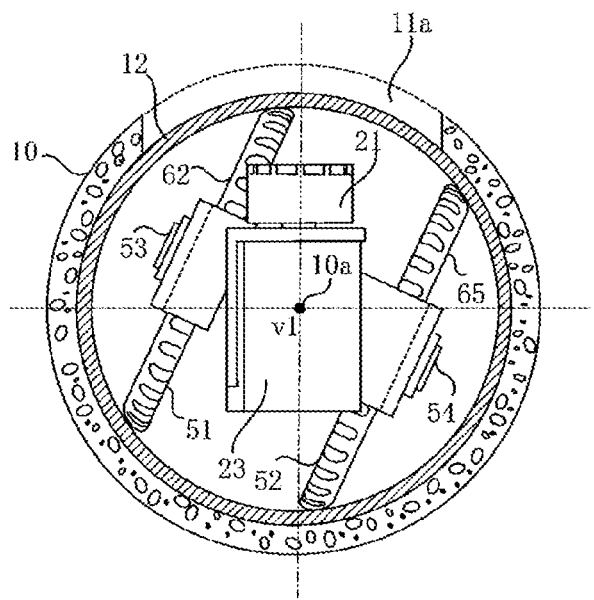

FIGS. 12a and 12b show a state in which the in-pipe robot rotates and rolls around the pipe axis of the main pipe and moves inside the main pipe. Even in such as case, all the wheels move in contact with the pipe lining material, so that the in-pipe robot can be stably advanced. Since the rotation axis v1 of the rotary actuator 30 also coincides with the pipe center axis of the main pipe 10, there is no eccentricity in the rotation of the drilling blade in the circumferential direction of the main pipe, ensuring that the cutting is the circumferential direction of the main pipe can be smoothly performed.

Figure 13A:
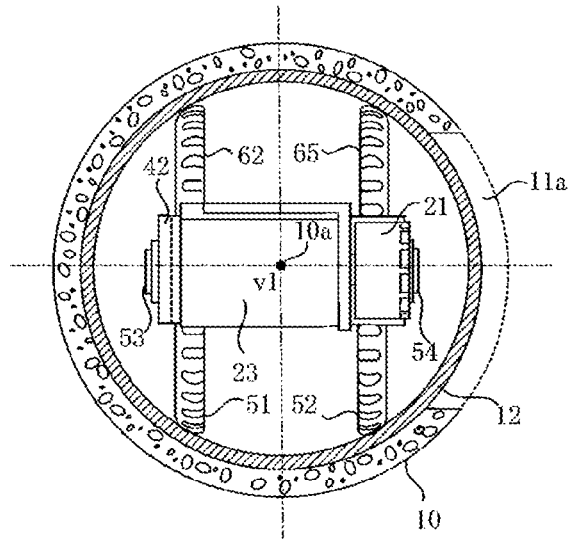
FIG. 13a is an illustrative view showing a state in which the in-pipe robot advances in the main pipe where a lateral pipe opening is on the side of the main pipe.
Figure 13B:
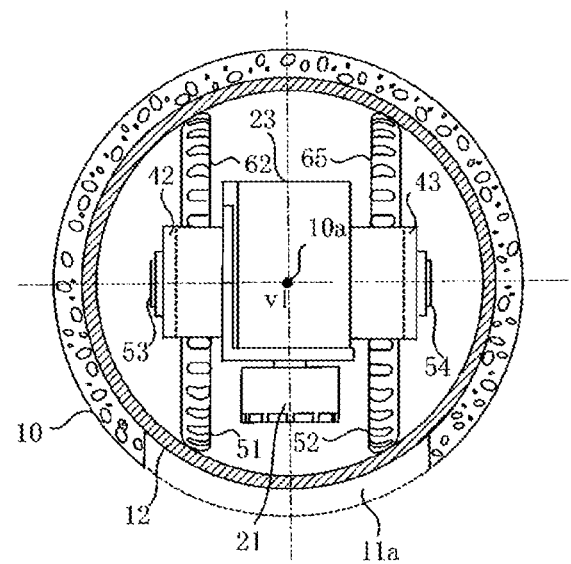
FIG. 13b is an illustrative view showing a state in which the in-pipe robot advances in the main pipe where the lateral pipe opening is at the bottom of the main pipe.

Even when the lateral pipe 11 is attached to the side surface of the main page 10 as shown in FIG. 13a, or is attached to the bottom of the main pipe 10 as shown in FIG. 13b, the drilling is performed in the same manner by advancing the in-pipe robot 20 to the vicinity of the center of the lateral pipe opening and then rotating the drilling blade sideways or downward, as is the same as in FIG. 10a in which the lateral pipe is attached to the upper part thereof. The rotation axis v1 of the rotary actuator 30 coincides with the pipe center axis of the main pipe 10, so that, when the drilling blade is rotated sideways or downward, it is possible to prevent the drilling blade from eccentrically hitting the pipe lining material and damaging the pipe lining material.

The in-pipe robot of the present embodiment is thus provided with the intermediate wheels between the front wheels and the rear wheels and can be traveled with the intermediate wheels brought into contact with the upper portion of the pipe lining material, so that the back-and-forth movement of the in-pipe robot can be made smooth. Even if the pipe diameter of the main pipe changes, the cutting in the circumferential direction of the main pipe can be smoothly performed without any eccentricity in the rotation of the drilling blade by bringing the intermediate wheels into contact with the upper part of the pipe lining material. At the same time, it is also possible to eliminate an adjustment work after attachment replacement due to the change in the pipe diameter. The intermediate wheels are also pressed against the pipe lining material, so that the frictional resistance increases and the driving force increases, enabling long-distance self-propelling even when many power cables and hydraulic hoses are connected.

In the above-described embodiment, the inner wall surface of the lined existing pipe is cut as an example, but the inner wall surface of the existing pipe before lining may be cut. Even in this case, the rotating axis v1 of the rotary actuator 30 is made coincident with the pipe center axis 10a of the main pipe 10 by bringing the in-pipe robot into a state in which the traveling wheels 51, 52, 71, 72 and the intermediate wheels 62, 65 come into contact with the inner wall surface of the existing pipe. Therefore, even if the drilling blade is rotated in the circumferential direction of the existing pipe, it is possible to prevent the drilling blade from being eccentric and unintentionally damaging the inner wall surface of the existing pipe.

Embodiment 2

Figure 15:
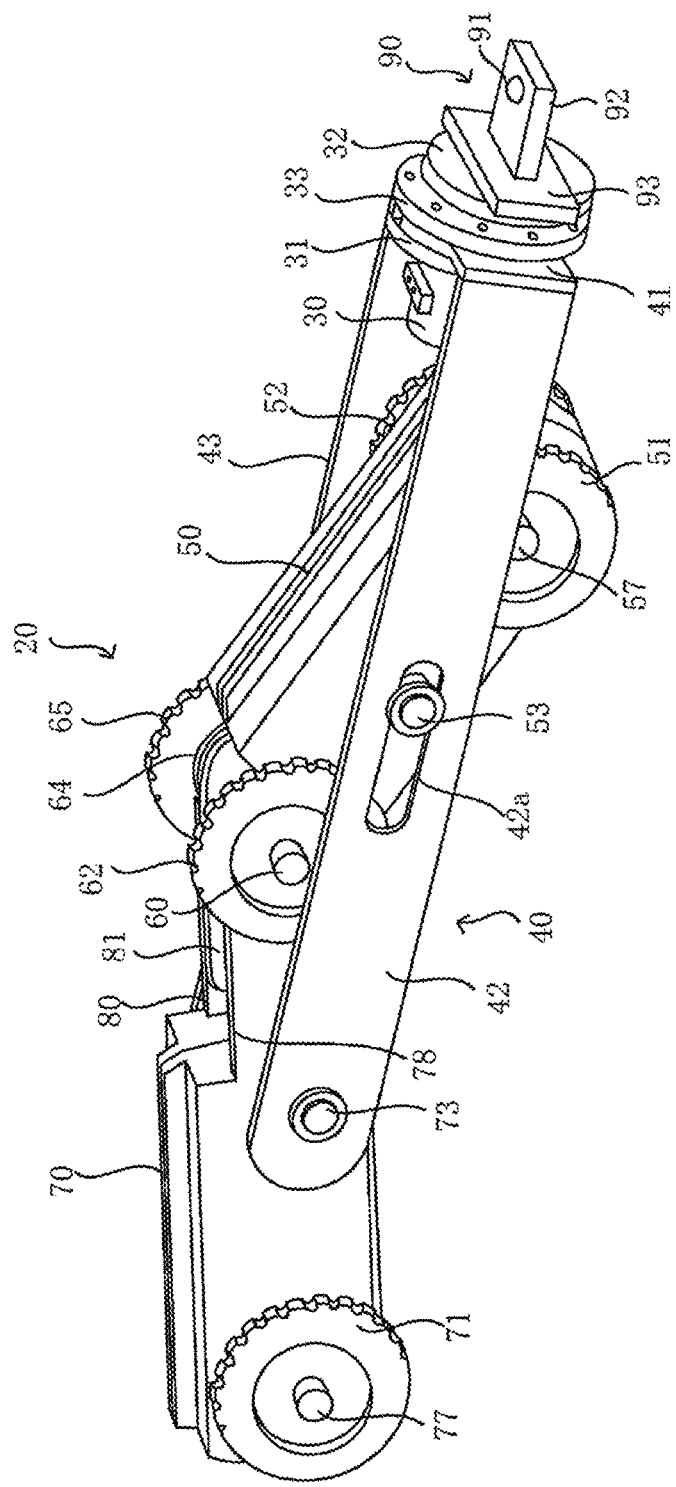
FIG. 15 is a perspective view of an in-pipe robot equipped with a camera for observing and photographing the inner wall surface of an existing pipe.
Figure 16:
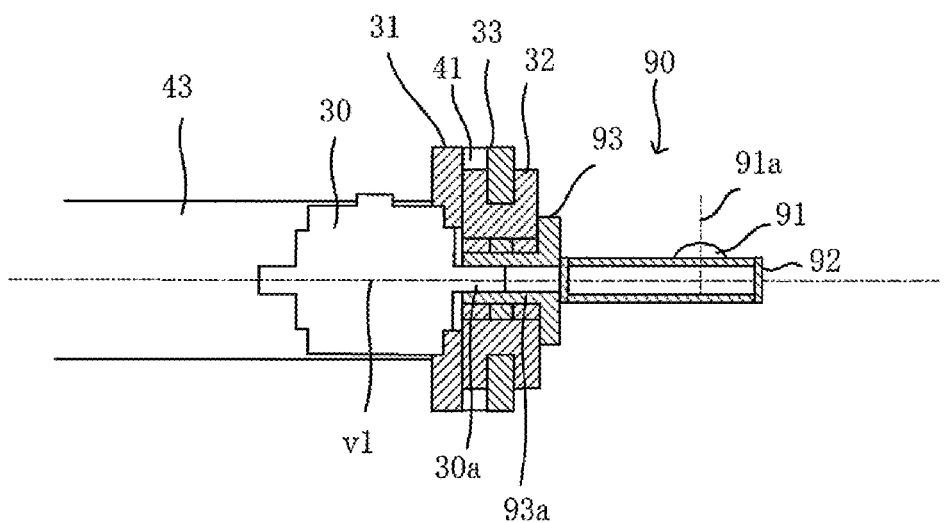
FIG. 16 is a vertical cross-sectional view of a camera section of the in-pipe robot.

In Embodiment 1 described above, a drilling unit is which the drilling blade 21, the drilling motor 23, the elevating cylinder 25, the holders 22, 24 and the like are integrated is attached to the chassis 40, and the in-pope robot functions as a drilling robot. In Embodiment 2, instead of the drilling unit, an inspection unit 90 for observing and photographing the inner wall surface of the main pipe is attached to the chassis 40, as shown in FIGS. 15 and 16, and the in-pipe robot functions as an inspection robot.

The inspection unit 90 includes a camera 92 provided with a lens 91 such as, for example, a wide-angle lens or a fisheye lens capable of photographing a wide range, and a mount plate 93 to which the camera 92 is fixed. The lens 91 is configured as a single lens or a composite lens, but in the case of this embodiment, it is shown as a single lens. Further, the camera 92 is set so that the photographing optical axis 91a of the lens 91 faces in the vertical (vertical) direction. In the camera 92, an image sensor such as a CCD or CMOS, a memory for storing a captured image, and other components necessary for imaging are arranged on the image plane of the lens 91, but the drawing becomes complicated. Therefore, these elements are not shown.

The mount plate 93 has a hollow cylindrical portion 93a at the central portion on the chassis side. The rotary shaft 30a of the rotary actuator 30 is press-fitted into the hollow cylindrical portion 93a, which is supported by the sliding bearing 32. The camera 92 is attached so that its photographing optical axis 91b is orthogonal to the rotation axis v1 of the rotary actuator 30. When the rotary actuator 30 is driven, the lens 91 rotates around the rotation axis v1 in the circumferential direction of the existing pipe.

Figure 18:
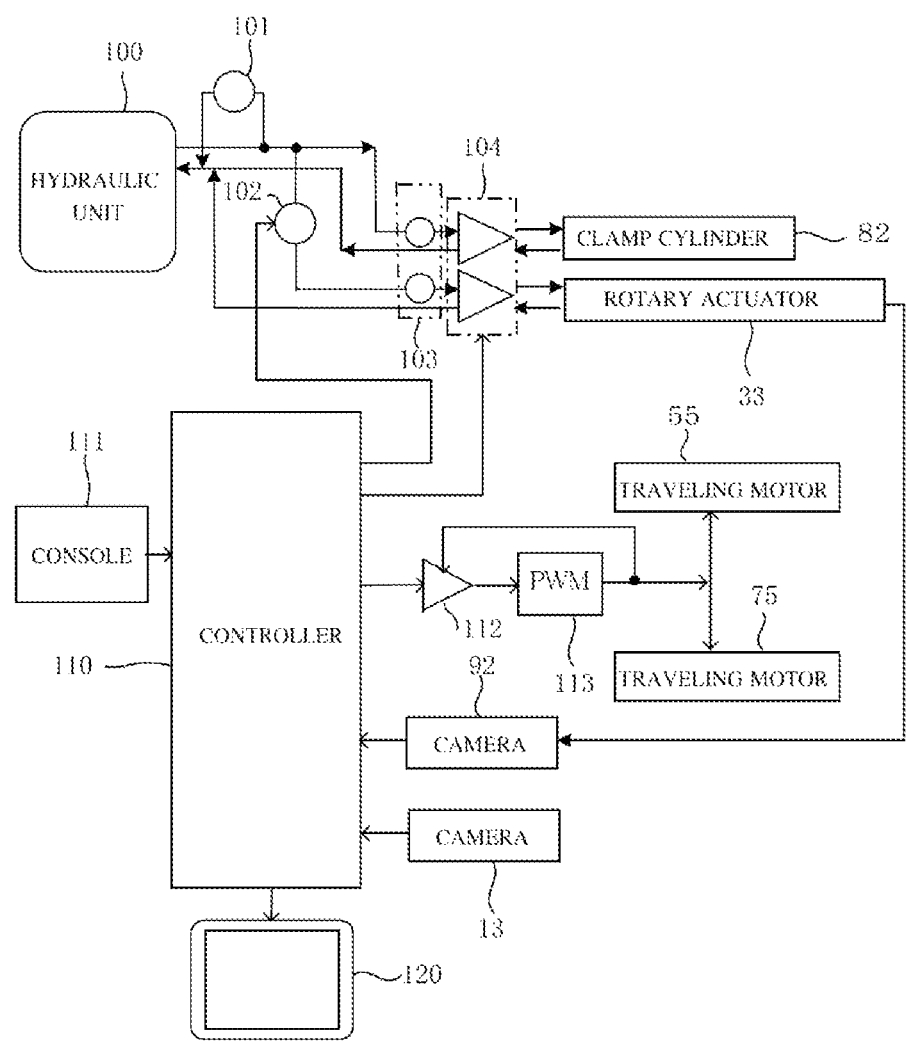
FIG. 18 is a block diagram showing a configuration as viewed when the in-pipe robot functions as an inspection robot.

FIG. 18 shows a circuit diagram for driving and controlling devices for controlling the in-pipe robot configured as an inspection robot. Compared with the circuit diagram shown in FIG. 14, the drilling motor 23 and the elevating cylinder 25 are not provided in FIG. 18, and the only difference is that the camera 92 is rotated by the rotary actuator 30, so that the detailed description of FIG. 18 is omitted.

Next, an operation will be described in which the in-pipe robot 20 thus configured is transported from the manhole 16 into the lined main pipe to observe and photograph the inner wall surface thereof.

Figure 17A:
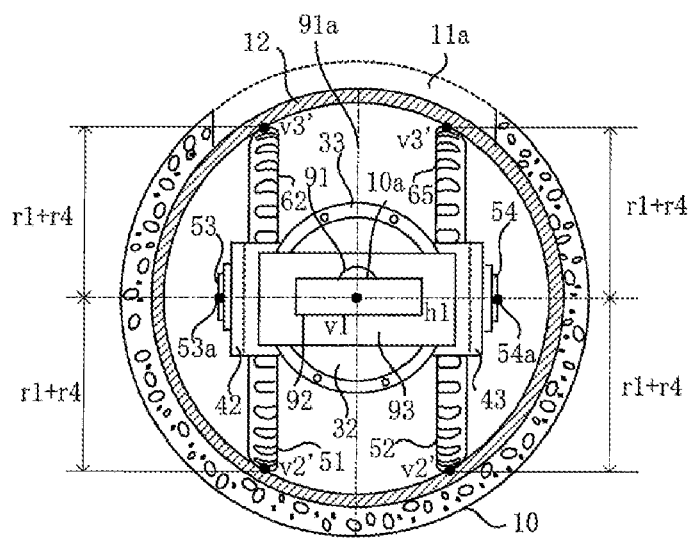
FIG. 17a is an illustrative view showing a state in which the inner wall surface of the main pipe top is photographed.

The in-pipe robot 20 is carried into the main pipe 10 with the wheel bodies 50 and 70 made horizontal, as is similar to Embodiment 1. The clamp cylinder 82 is driven to raise the intermediate wheels 62 and 65 until they come into contact with the pipe lining material 12. This state is shown in FIG. 17*a*, and similarly in FIG. 10*b*, the vertical distance to the horizontal plane h1 from the point v2' at which the traveling wheels 51 and 52 (and the traveling wheels 71 and 72) come into contact with the pipe lining material is r1+r4. The vertical distance to the horizontal plane h1 from the points v3' at which the intermediate wheels 62 and 65 come into contact with the pipe lining material is also the same r1+r4. Therefore, the radial distances to the rotation axis v1 of the rotary actuator 30 from the points v2' and v3' at which the wheels come into contact with the pipe lining material are all the same, so that the rotation axis v1 coincides with the pipe center axis 10*a* of the main pipe 10.

The intermediate wheels 62 and 65 are thus brought into contact with the upper portion of the pipe lining material, and the traveling motors 55 and 75 are driven to advance the in-pipe robot 20. When the in-pipe robot comes to a predetermined position, it is temporarily stopped and the inner wall surface of the main pipe is observed and photographed by the camera 92. Since the optical axis 91*a* of the lens 91 is orthogonal to the rotation axis v1 of the rotary actuator 30 and faces in the vertical direction, an area with the top of the main tube 10 centered is photographed as a still image, and the image thereof is displayed on the display 120 and stored in the memory in the camera 92.

Figure 17B:
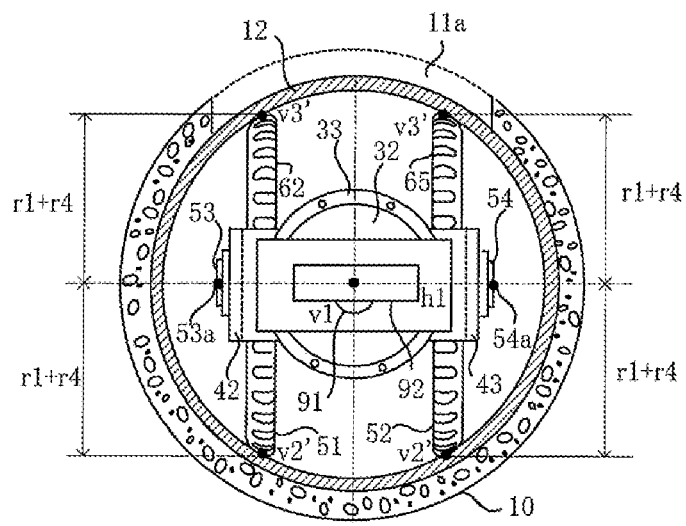
FIG. 17b is an illustrative view showing a state in which the inner wall surface of the main pipe bottom is photographed.

When it is desired to observe and photograph other parts at the stop position of the in-pipe robot 20, the rotary actuator 30 is driven to rotate the camera 92 in the circumferential direction of the main pipe. For example, FIG. 17*b* shows an example of rotation by 180 degrees. At this position, an area with the bottom of the main pipe 10 centered is photographed as a still image.

When it is desired to observe and photograph the other inner wall surface of the main pipe 10, the in-pipe robot 20 is advanced to that position and the rotary actuator 30 is rotated to observe and photograph the desired position. Since the rotation axis v1 of the rotary actuator 30 coincides with the pipe center axis 10*a* of the main tube 10, the radial distance between the lens surface and the inner wall surface of the main tube 10 is the same regardless of the position where the camera 92 is rotated, and a good quality image is taken independently of the rotation of the camera 92.

In the above example, the inner wall surface of the main pipe was photographed as a still image. However, while moving the in-pipe robot 20 and during this movement, the rotary actuator 30 can be rotated as needed to display various parts of the inner wall surface of the main pipe on the display 120 as moving images or to store them in the memory. Further, a plurality of lenses whose imaging optical axis is orthogonal to the rotation axis v1 of the rotary actuator 30 are attached to the camera 92 in the circumferential direction of the main pipe, and the rotary actuator 30 is rotated to photograph the inner wall surface of the main pipe by the lenses from various directions as still or moving images, which can be displayed on the display or stored in the memory.

In the above example, the inner wall surface of the lined main pipe is observed and photographed, so that it is possible to inspect whether the main pipe has been lined with a specified quality. However, it is also possible o observe and photograph the inner wall surface of the main pipe before lining. In this case, the degree of damage to the inner wall surface of the main pipe can be inspected, and it is possible to inspect whether or not the main pipe should be lined.

Embodiment 3

The in-pipe robot 20 can function as a mounting robot that mounts a lateral pipe limning material for lining the inner wall surface of the lateral pipe 11 and transports the lateral pipe lining material to the lateral pipe position. This embodiment is illustrated in FIGS. 19 through 22.

Figure 21:
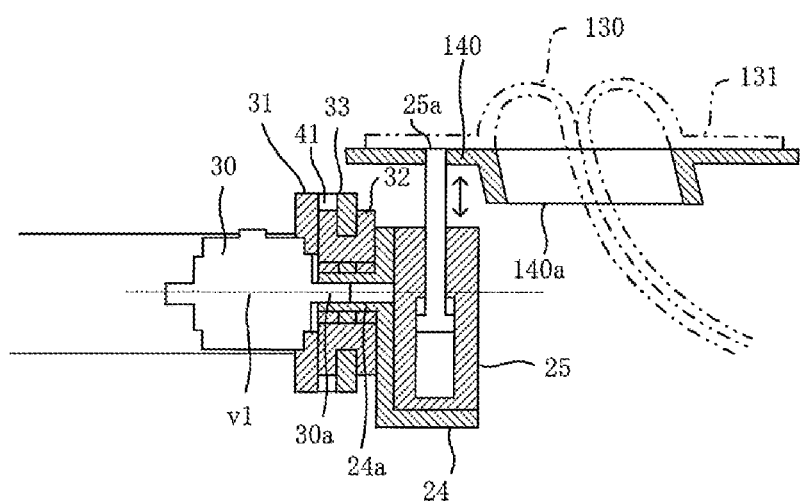
FIG. 21 is a vertical cross-sectional view of a mount head section of the in-pipe robot.

In the in-pipe robot 20 shown in Embodiment 1, the piston 25*a* of the elevating cylinder 25 is disconnected from the holder 22, and the drilling motor 23, the lateral plate 26, the guide 27 and the like are removed. As shown in FIG. 21, a mount head 140 is attached to the distal end of the piston 25*a* of the elevating cylinder 25. In order to tightly mount a collar 131 of a lateral pipe lining material 130, the mount head 140 has a curved surface that is larger than the collar 131 and curved with the same curvature as the collar 131, and has at the center a hollow cylindrical portion 140*a* into which the lateral pipe lining material 130 can be inserted.

The lateral pipe lining material 130 is made of the same material as the pipe lining material 12, and includes a resin absorbent material made of a tubular flexible non-woven fabric impregnated with an uncured liquid curable resin and the collar 131 at one end thereof that has a curved surface curved in an arc shape having a curvature equal to the main pipe 10. The lateral pipe lining material 130 is housed in a pressure bag 133 relayed via a joint 132. A peeling end 135 is attached to the other end of the lateral pipe lining material 130. A tow rope 136 and an air bleeding hose 137 are attached to the other end of the peeling end 125, and the other end of the pressure back 133 is air-tightly sealed by a cap 138. Further, a peeling tube 134 is attached between the joint 132 and the collar 131, and a sealed space closed by the peeling tube 134 and the lateral pipe lining material 130 is formed in the pressure bag 133.

Figure 22:
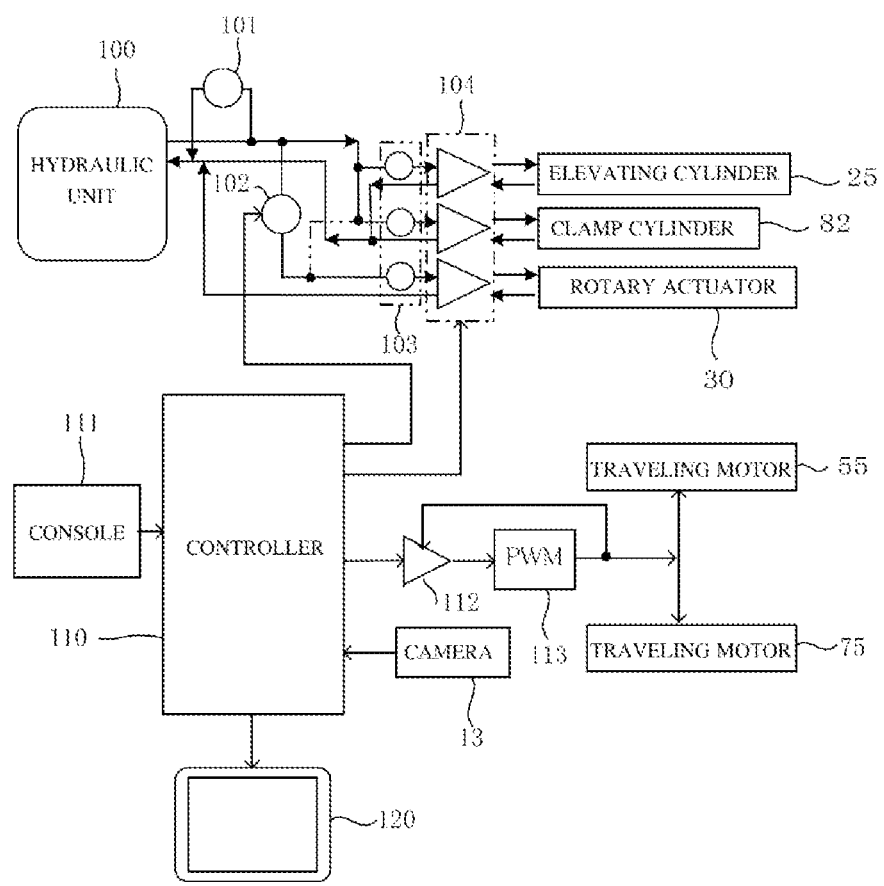
FIG. 22 is a block diagram showing a configuration as viewed when the in-pipe robot functions as a mounting robot.

FIG. 22 shows a circuit diagram for driving and controlling devices for controlling the in-pipe robot configured as a mounting robot. The detailed description of FIG. 22 will be omitted because the only difference in that there is no system for driving the drilling motor 23 as compared with the circuit diagram shown in FIG. 14.

Next, an operation will be described in which the in-pipe robot 20 thus configured carried into the main pipe 10 and the lateral pipe lining material 130 is inserted and everted into the lateral pipe 11 to line the lateral pipe 11. The in-pipe robot 20 shall travel on an unlined main pipe.

Similar to Embodiments 1 and 2, the in-pipe robot 20 is carried into the main pipe 10 with the wheel bodies 50 and 70 made horizontal, and the clamp cylinder 82 is driven to raise the intermediate wheels 62 and 65 until they come into contact with the inner wall surface of the main pipe 10. In this state, as described in Embodiments 1 and 2, the radial distances to the rotation axis v1 of the rotary actuator 30 from the points at which the wheels 51, 52, 71, 72, 62 and 65 come into contact with the inner wall surfaces of the main pipe are all the same, so that the rotation axis v1 coincides with the pipe center axis 10*a* of the main pipe 10.

The lateral pipe lining material 130 is mounted on the mount head 140 so that the opening of the collar 131 is aligned with the opening of the hollow cylindrical portion 140*a*. The pressure bag 133 in which the lateral pipe lining material 130 is housed is attached at one end to the hollow cylindrical portion 140*a* of the mount head 140. The elevating cylinder 25 is driven to lower the piston 25*a* so that the lateral pipe lining material 130 protruding upward from the mount head 140 does no collide with the inner wall surface of the main pipe.

Figure 19:
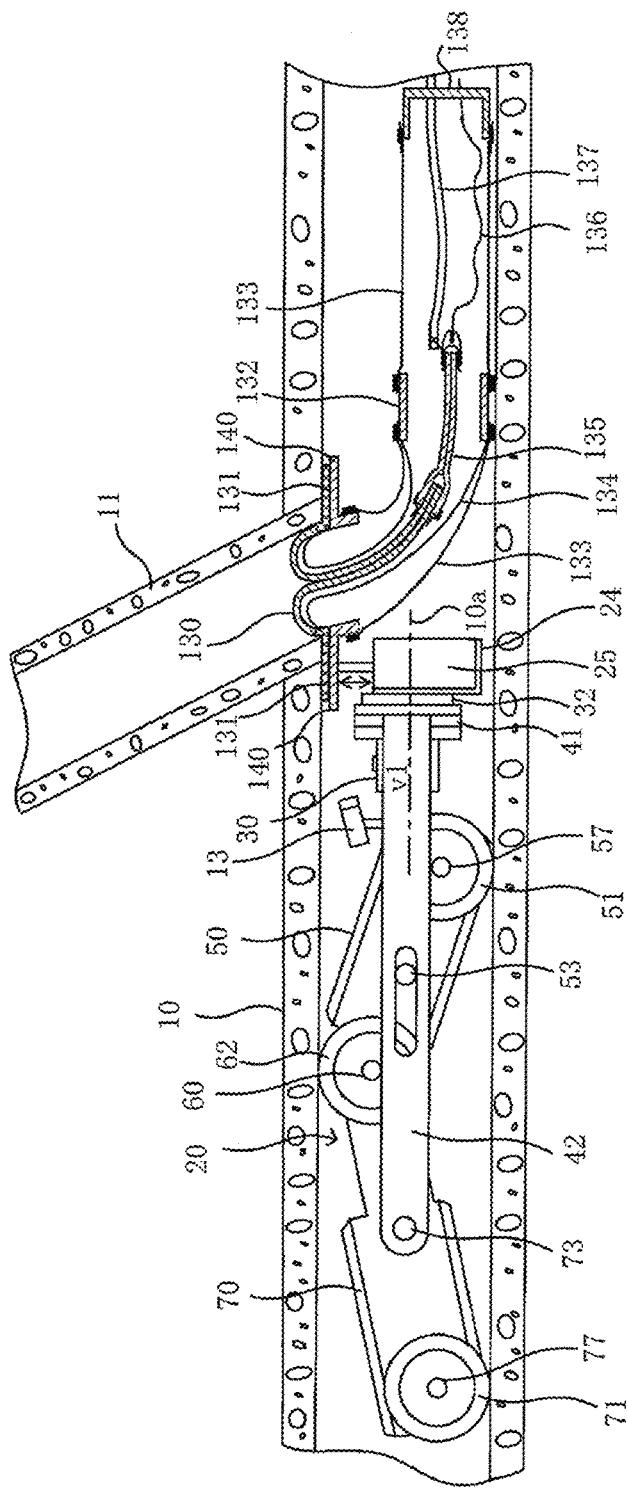
FIG. 19 is an illustrative view showing a state in which a lateral pipe is lined using the in-pipe robot.

In this state, the traveling motors 55 and 75 are driven to advance the in-pipe robot 20 together with the pressure bag 133. When the lateral pope lining material 130 reaches a position where it can be inserted into the lateral pipe 11, the in-pipe robot 20 is stopped and the rotary actuator 30 is driven to rotate the mount head 140 in the circumferential direction of the main pipe so that the opening of the hollow cylindrical portion 140a aligns with the lateral pipe opening. Subsequently, the elevating cylinder 25 is driven to raise the mount head 140 and bring the collar 131 into close contact with the inner wall surface of the main pipe. This state is illustrated in FIG. 19.

In this state, compressed air is supplied into the pressure bag 133 via a compressed air supply hose (not shown) connected to the cap 138, and then supplied also to the sealed space closed by the peeling tube 134 and the lateral pipe lining material 130 to evert and insert the lateral pipe lining material 130 into the lateral pipe 11.

Figure 20:
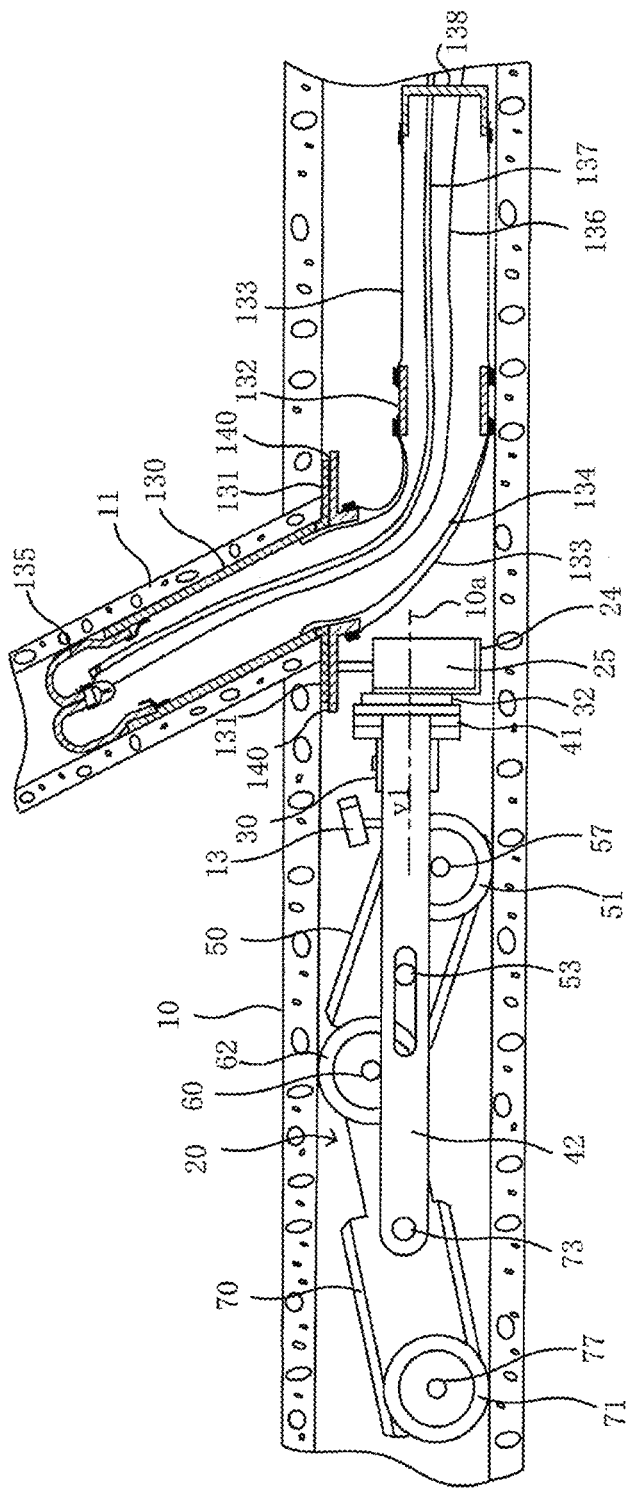
FIG. 20 is an illustrative view showing a state in which a lateral pie lining material has been everted and inserted.

After the lateral pipe lining material 130 is, as shown in FIG. 20, inserted into the lateral pipe 11 over the entire length, hot water is supplied to the pressure bag 133 via a hot water supply hose (not shown) connected to the cap 138 to cure the lateral pipe lining material 130 and line the lateral pipe 11. The air in the pressure bag 133 is discharged due to the hot water supply to the outside through an air bleeding hose 137.

After the lining of the lateral pipe 11 is completed, the mount head 140 is lowered and the peeling end 135 is pulled downward by the tow rope 136 and removed from the lateral pipe lining material 130. This completes a series of lining operations.

In such a lining work, the rotation axis v1 of the rotary actuator 30 coincides with the pipe center axis 10a of the main pipe 10. Therefore, when the mount head 140 is aligned with the lateral pipe opening, the mount head 140 and the lateral pipe lining material 130 do not come into contact with the inner wall surface of the main pipe regardless of rotation of the mount head 140 to any position in the circumferential direction of the main pipe. This allows the in-pipe work to be made more efficient. Further, even if the pipe diameter of the main pipe is different, the rotation axis v1 of the rotary actuator 30 coincides with the pipe center axis 10a of the main pipe 10. Therefore, it is possible to omit the conventional step of adjusting the height of the mount head each time the pipe diameter changes.

In Embodiments 1, 2 and 3 described above, the traveling motors 55 and 75 are sued to rotate the traveling wheels 51, 52, 71 and 72 and move the in-pipe robot, but tow ropes may be fixed to the front and rear ends of the side frames 42 and 43, respectively. To move the in-pipe robot, the one tow rope is towed by a winch on the ground through a manhole on the transportation side and the other tow rope is towed by a winch on the ground through a manhole in the traveling direction.

In Embodiments 1, 2 and 3 described above, a hydraulic cylinder is used as elevating means for raising and lowering the rotary actuator and the intermediate wheels, but a pull spring may be used with one end thereof attached to the one wheel body and the other end attached to the other wheel body to raise and lower the rotary actuator and the intermediate wheels.

In Embodiments 1, 2 and 3 described above, the traveling motors 55 and 75 are driven synchronously, but it is also possible to stop the one traveling motor and drive the other traveling motor such that the wheel body with the other traveling motor built-in moves in the direction towards the wheel body with the stopped traveling motor built-in or in the opposite direction to raise and lower the rotary actuator and the intermediate wheels. In this case, the traveling motors 55 and 75 function as elevating means for raising and lowering the rotary actuator and the intermediate wheels.

In Embodiments 1, 2 and 3 described above, the pins provided on the front wheel body are slid in the slots of the side frames, but the pins provided on the rear wheel body may be slid in the slots. In this case, the rear wheel body is the first wheel body, and the front wheel body is the second wheel body.

In Embodiments 1, 2 and 3 described above, the rotary actuator 30 is a hydraulic motor, but it may be an electric motor such as a stepping motor or a servo motor. Further, an electric motor or an air motor may be used for the drilling motor 23 of Embodiment 1.

KEY TO THE SYMBOLS 10 main pipe
11 lateral pipe
12 pipe lining material
13 camera
17 illumination lamp
20 in-pipe robot
21 drilling blade
23 drilling motor
25 elevating cylinder
30 rotary actuator
32 sliding bearing
40 chassis
41 front frame
42, 43 side frame
42a, 43a slot
50 wheel body
51, 52 traveling wheel
53, 54 pin
55 traveling motor
57, 60 axle
62, 65 intermediate wheel
70 wheel body
71, 72 traveling wheel
73, 74 pin
75 traveling motor
77 axle
82 clamp cylinder
90 inspection unit
91 lens
92 camera
100 hydraulic unit
101 relief valve
102 regulator
103 throttle valve
104 directional switching valve
110 controller
111 console
113 pulse width modulator
130 lateral pipe lining material
133 pressure bag
140 mount head

The invention claimed is:
1. An in-pipe robot that is carried into an existing pipe and can travel in the existing pipe, comprising:
a chassis having on both sides side frames in which a horizontally extending slot is formed;
a first wheel body to which pins slidable in the slot are attached on both sides and which is supported between the side frames via the pins and has traveling wheels attached to one end on both sides;

a second wheel body that is supported between the side frames via pins attached on both sides on the same horizontal plane as the pins of the first wheel body and that has traveling wheels attached to one end on both sides, the other end on both sides being rotatably coupled to the other end of the first wheel body via axles to which intermediate wheels are attached, respectively;

a rotary actuator mounted on the chassis such that the rotation axis thereof is on the same horizontal plane as the pins on both sides of the first and second wheel bodies and is located at the center between the traveling wheels of the first and second wheel bodies; and elevating means for sliding the pins of the first wheel body in the slots to rotate the first and second wheel bodies around the axles as a pivot and raise and lower the rotary actuator and the intermediate wheels;

wherein the intermediate wheels on both sides and the traveling wheels on both sides of the first and second wheel bodies all have the same shape and the wheel surfaces on each side have the same vertical plane, respectively;

the pin on each side of the first wheel body is attached to the midpoint of a line connecting the traveling wheel center of the first wheel body and the intermediate wheel center on the same side, and the pin on each side of the second wheel body is attached to the midpoint of a line connecting the traveling wheel center of the second wheel body and the intermediate wheel center on the same side; and when the intermediate wheels on both sides are raised until they are brought into contact with the inner wall surface of the existing pipe by the elevating means, the radial distances to the rotation axis of the rotary actuator from points at which the traveling wheels on both sides of the first and second wheel bodies and the intermediate wheels on both sides come into contact with the inner wall surfaces of the existing pipe are respectively equal, and the rotation axis of the rotary actuator coincides with the pipe center axis of the existing pipe.

2. An in-pipe robot according to claim 1, wherein a drilling blade that rotates around a rotation axis orthogonal to the rotation axis of the rotary actuator and is rotatable by the rotary actuator around the rotation axis thereof in the circumferential direction of the existing pipe is attached to the chassis.

3. An in-pipe robot according to claim 1, wherein a camera equipped with a lens whose photographing optical axis is orthogonal to the rotation axis of the rotary actuator and which is rotatable by the rotary actuator around the rotation axis thereof in the circumferential direction of the existing pipe is attached to the chassis.

4. An in-pipe robot according to claim 1, wherein a mount head that is rotated by the rotary actuator around the rotation axis thereof in the circumferential direction of the existing pipe and that mounts a pipe lining material inserted into a lateral pipe that intersects the existing pipe is attached to the chassis.

5. An in-pipe robot according to claim 1, wherein the intermediate wheels on both sides are rotatably attached to the axles, respectively.

6. An in-pipe robot according to claim 1, wherein the rotary actuator is a hydraulic motor or an electric motor.

7. An in-pipe robot according to claim 1, wherein the traveling wheel of the first wheel body is the front wheel, and the traveling wheel of the second wheel body is the rear wheel.

8. An in-pipe robot according to claim 1, wherein the traveling wheel of the first wheel body is the rear wheel, and the traveling wheel of the second wheel body is the front wheel.

9. An in-pipe robot according to claim 1, wherein the elevating means is a hydraulic cylinder in which one end of a piston is fixed to the one wheel body and a cylinder section is fixed to the other wheel body.

10. An in-pipe robot according to claim 1, wherein the elevating means is a pull spring whose respective ends are coupled to the first and second wheel bodies.

11. An in-pipe robot according to claim 1, wherein the first and second wheel bodies have built-in traveling motors that rotate the traveling wheels of the first and second wheel bodies, respectively.

12. An in-pipe robot according to claim 11, wherein the elevating means are the traveling motors built into the first and second wheel bodies, and one traveling motor is stopped with the other traveling motor being driven such that the wheel body with the other traveling motor built-in moves in the direction toward the wheel body with the stopped traveling motor built-in or in the opposite direction to raise and lower the rotary actuator and the intermediate wheels.

* * * * *